Jan. 30, 1968  E. O. BLODGETT  3,366,322
HIGH SPEED PUNCH
Filed Aug. 10, 1965  13 Sheets-Sheet 1
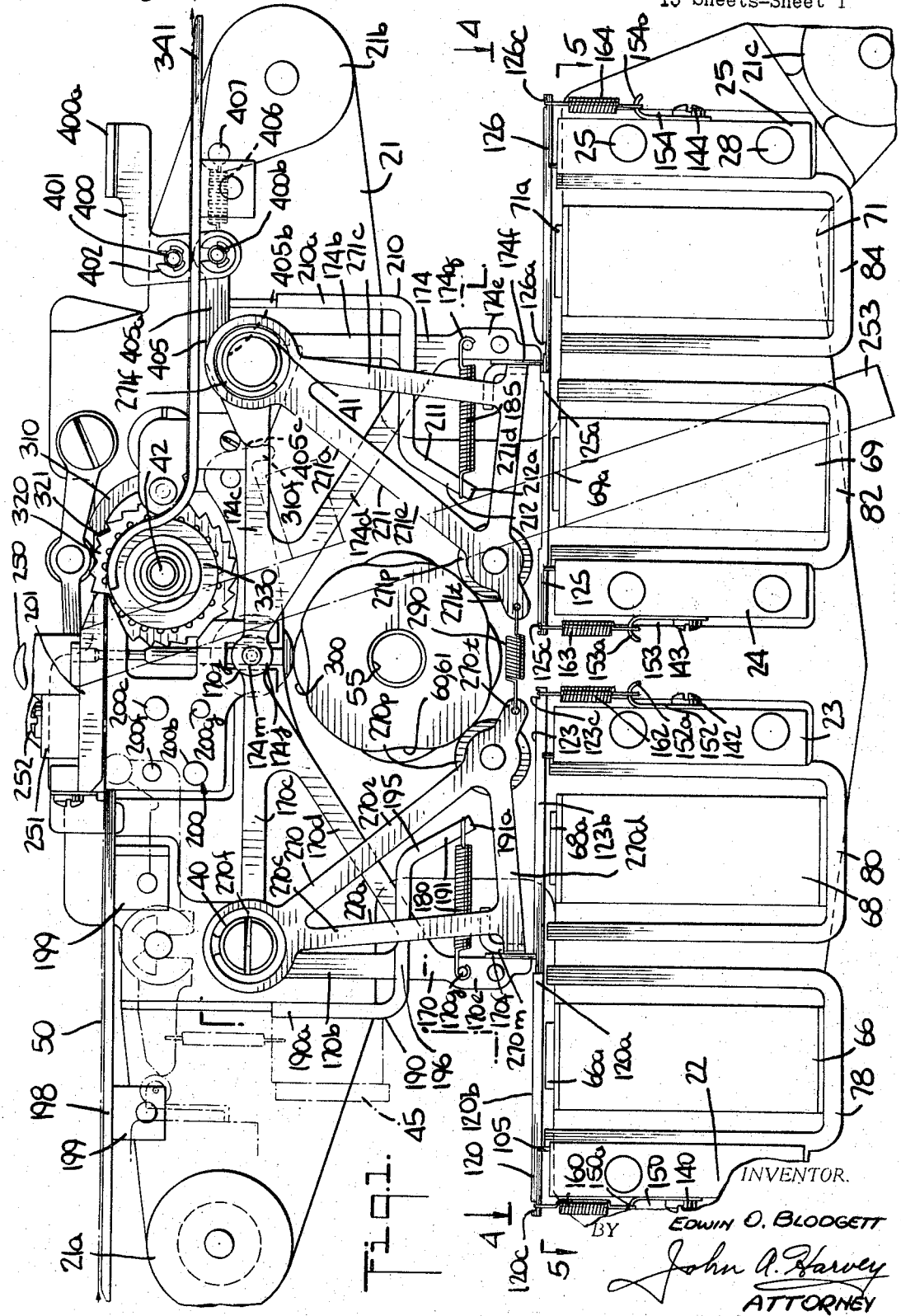
INVENTOR.
Edwin O. Blodgett
BY John A. Harvey
ATTORNEY

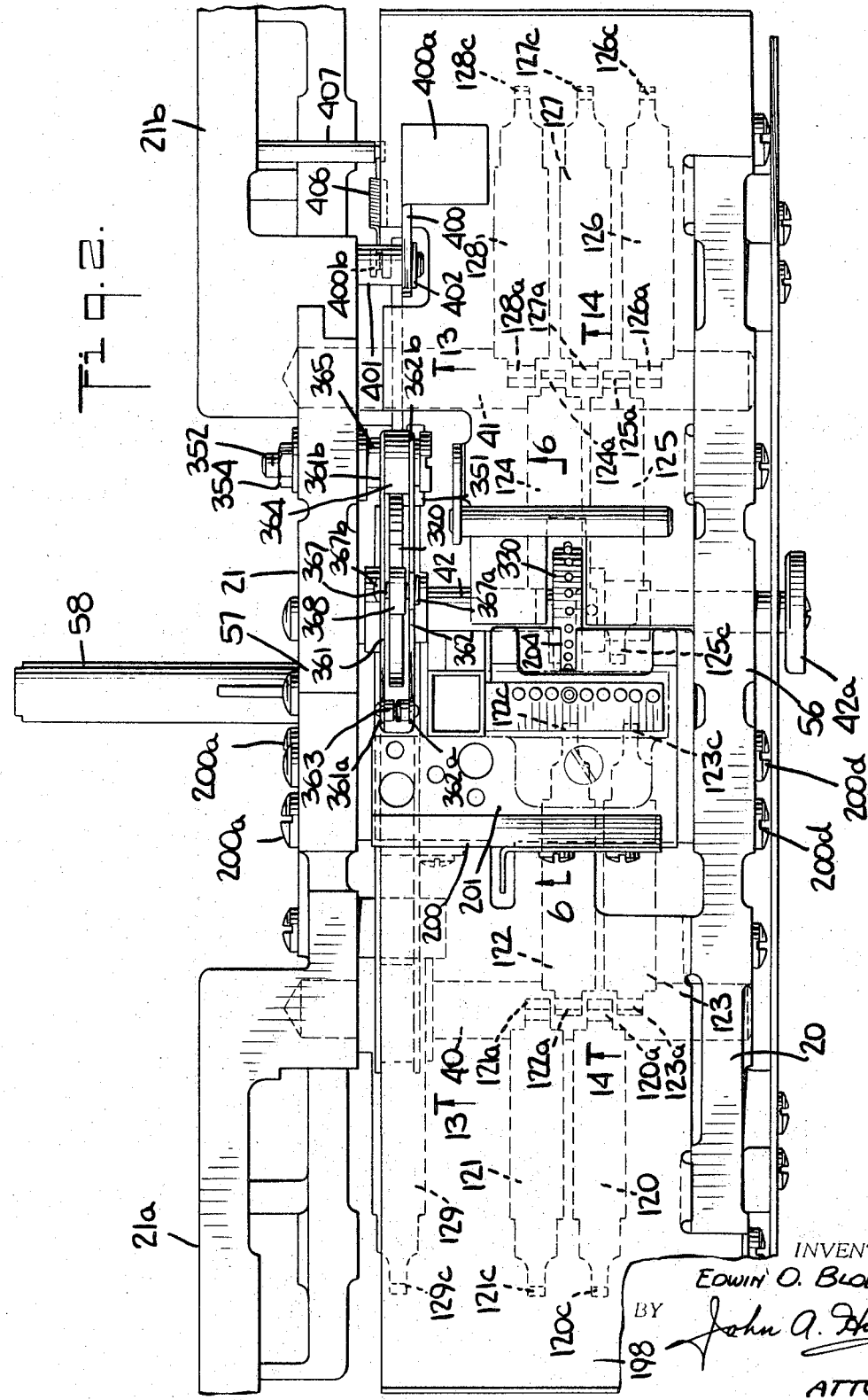

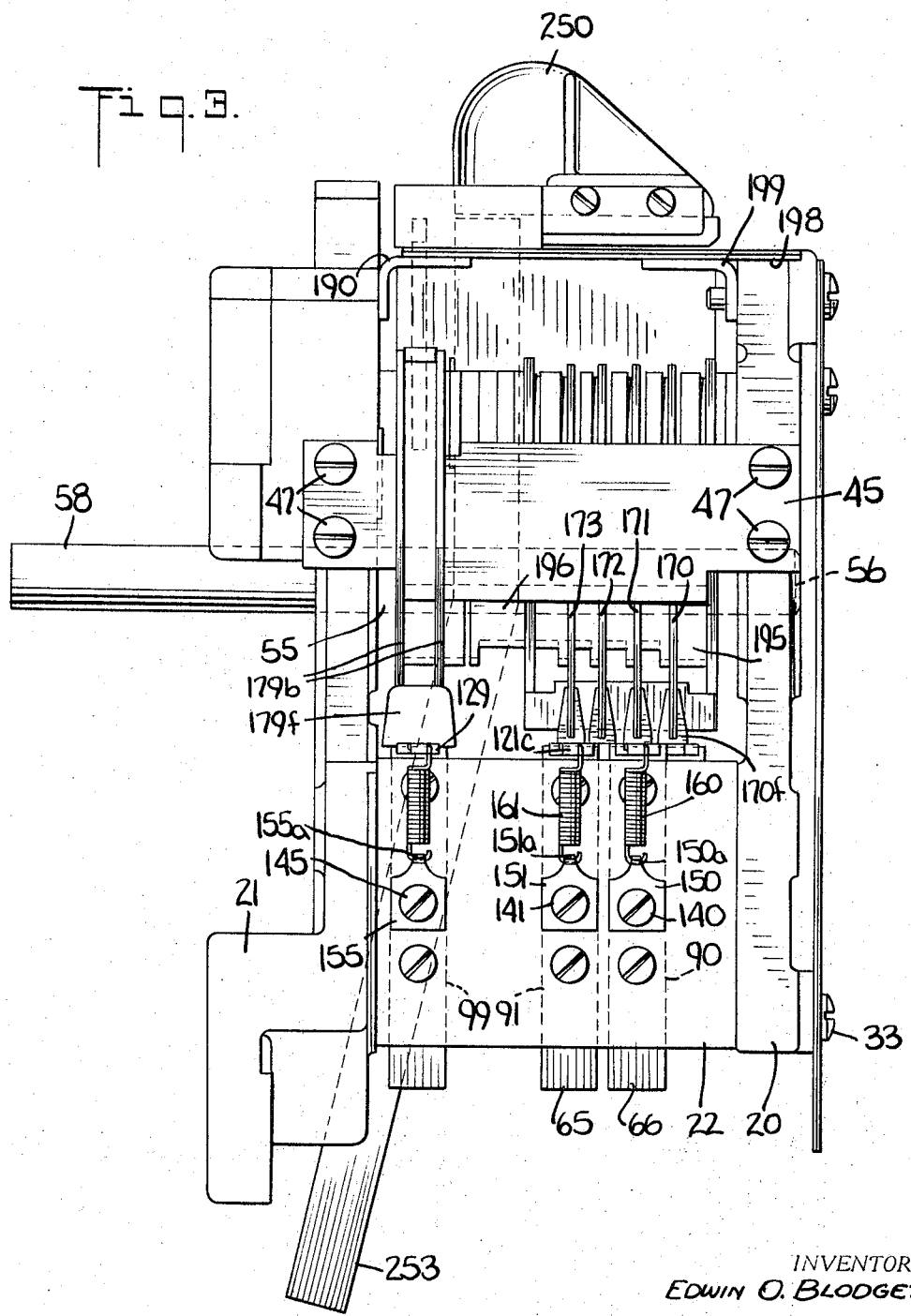

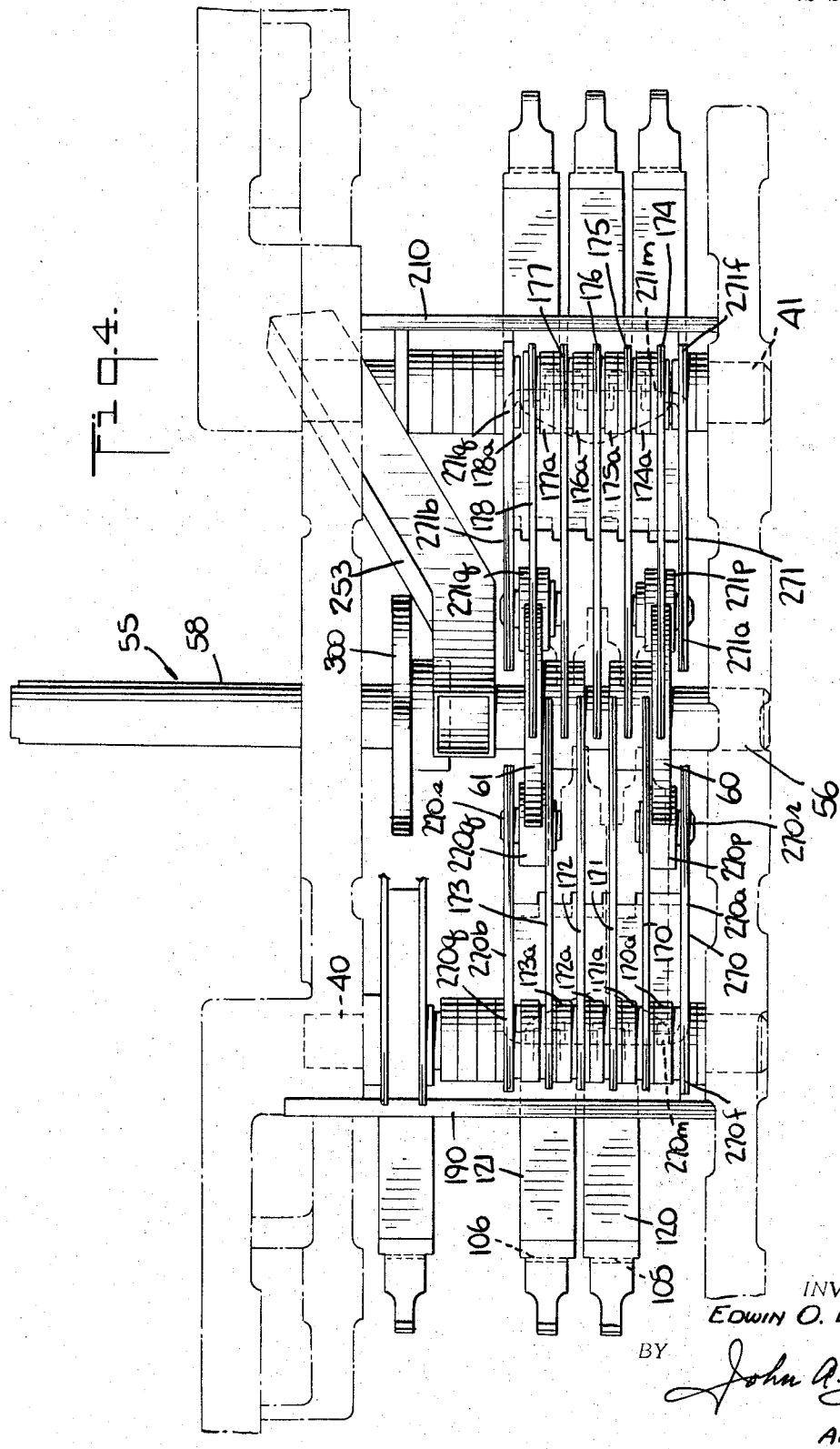

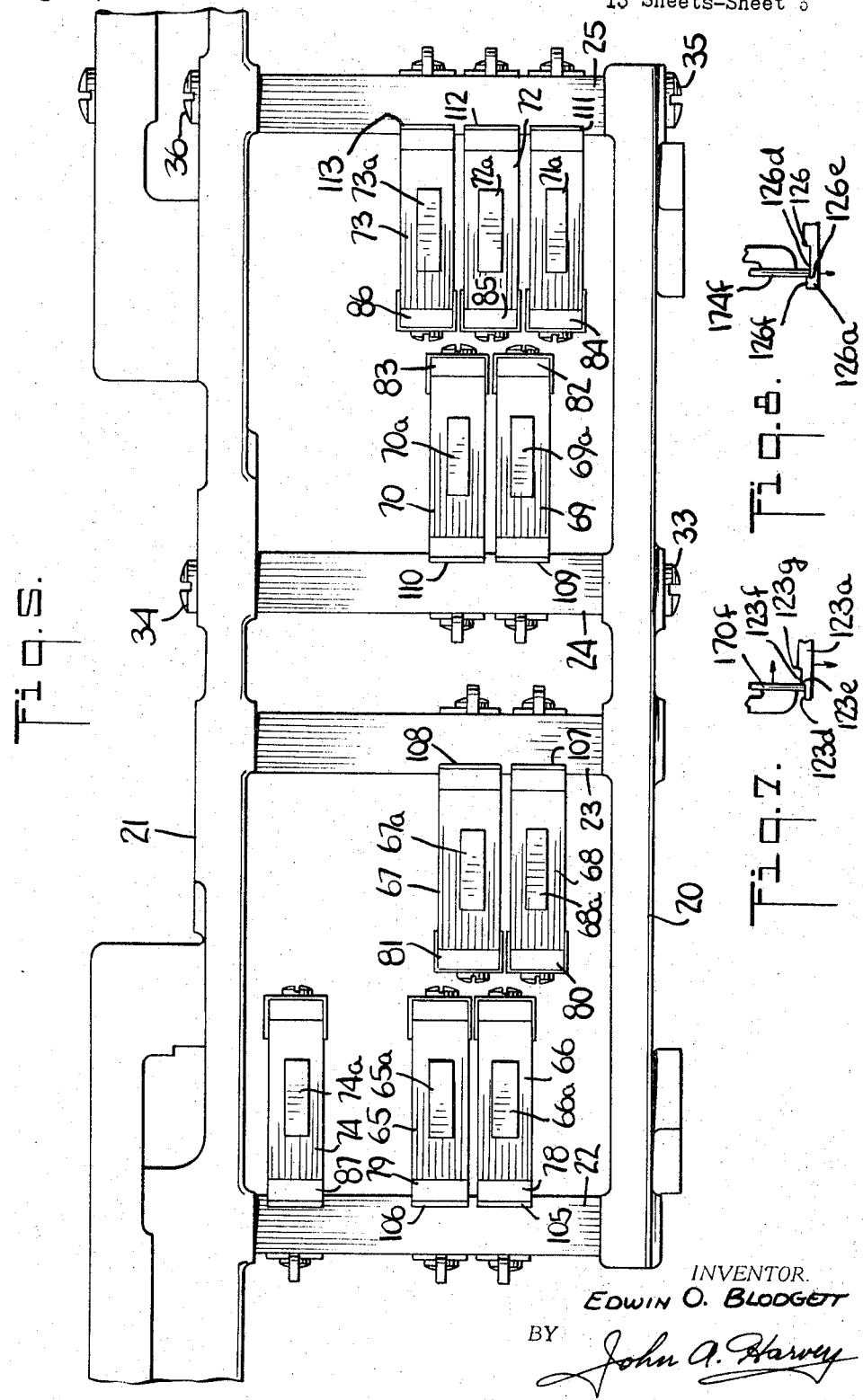

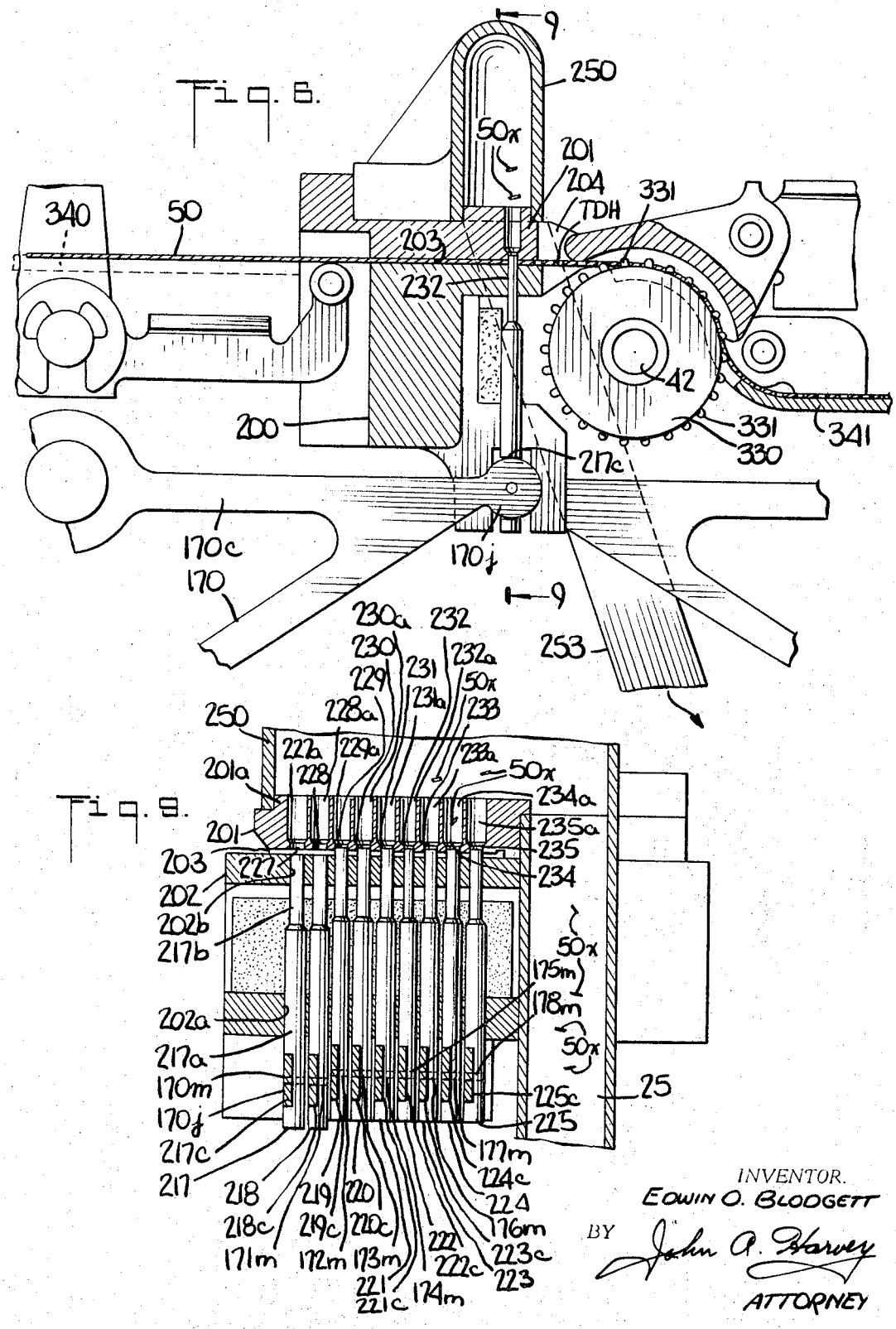

Jan. 30, 1968  E. O. BLODGETT  3,366,322
HIGH SPEED PUNCH
Filed Aug. 10, 1965  13 Sheets-Sheet 7
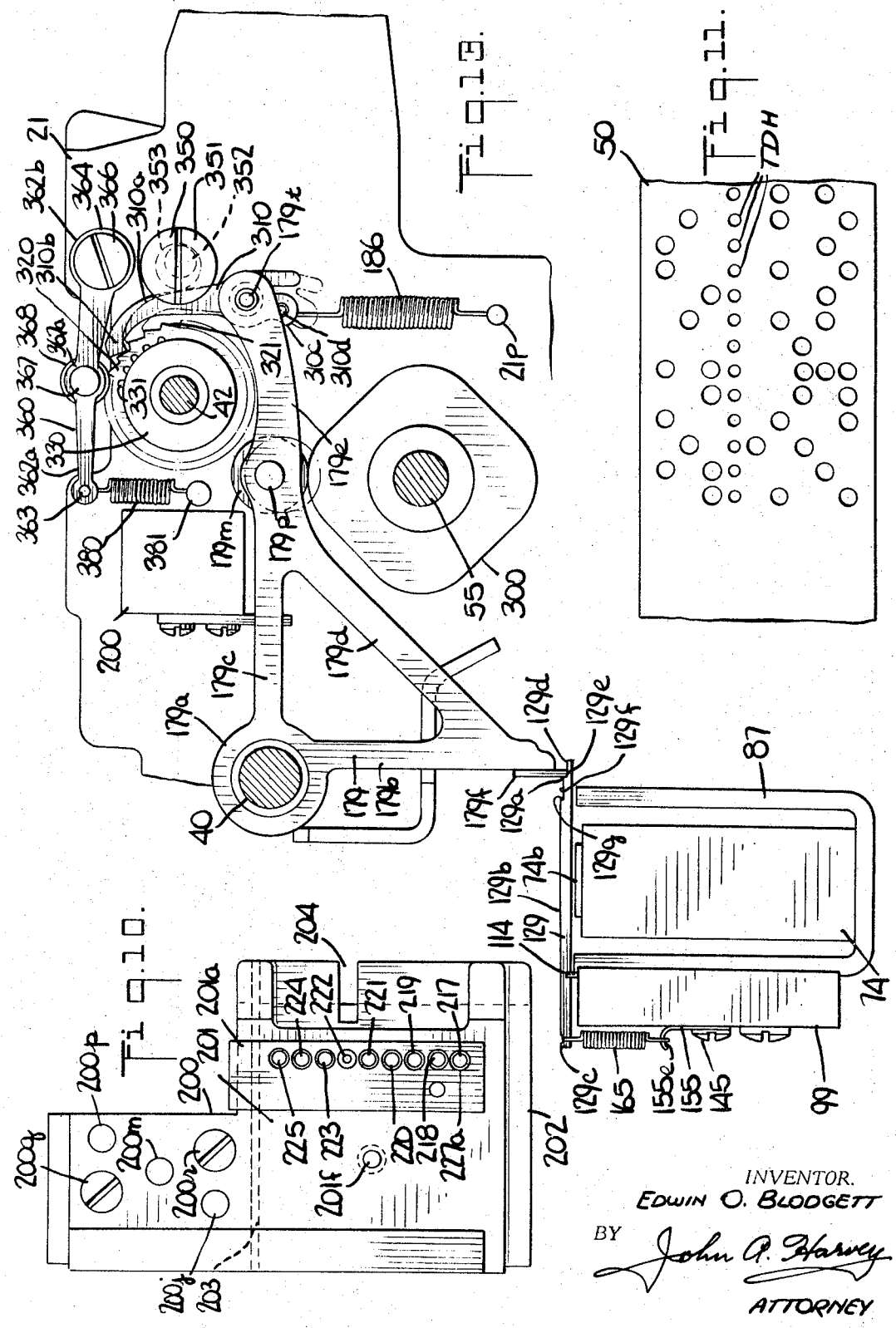
INVENTOR.
EDWIN O. BLODGETT
BY
ATTORNEY

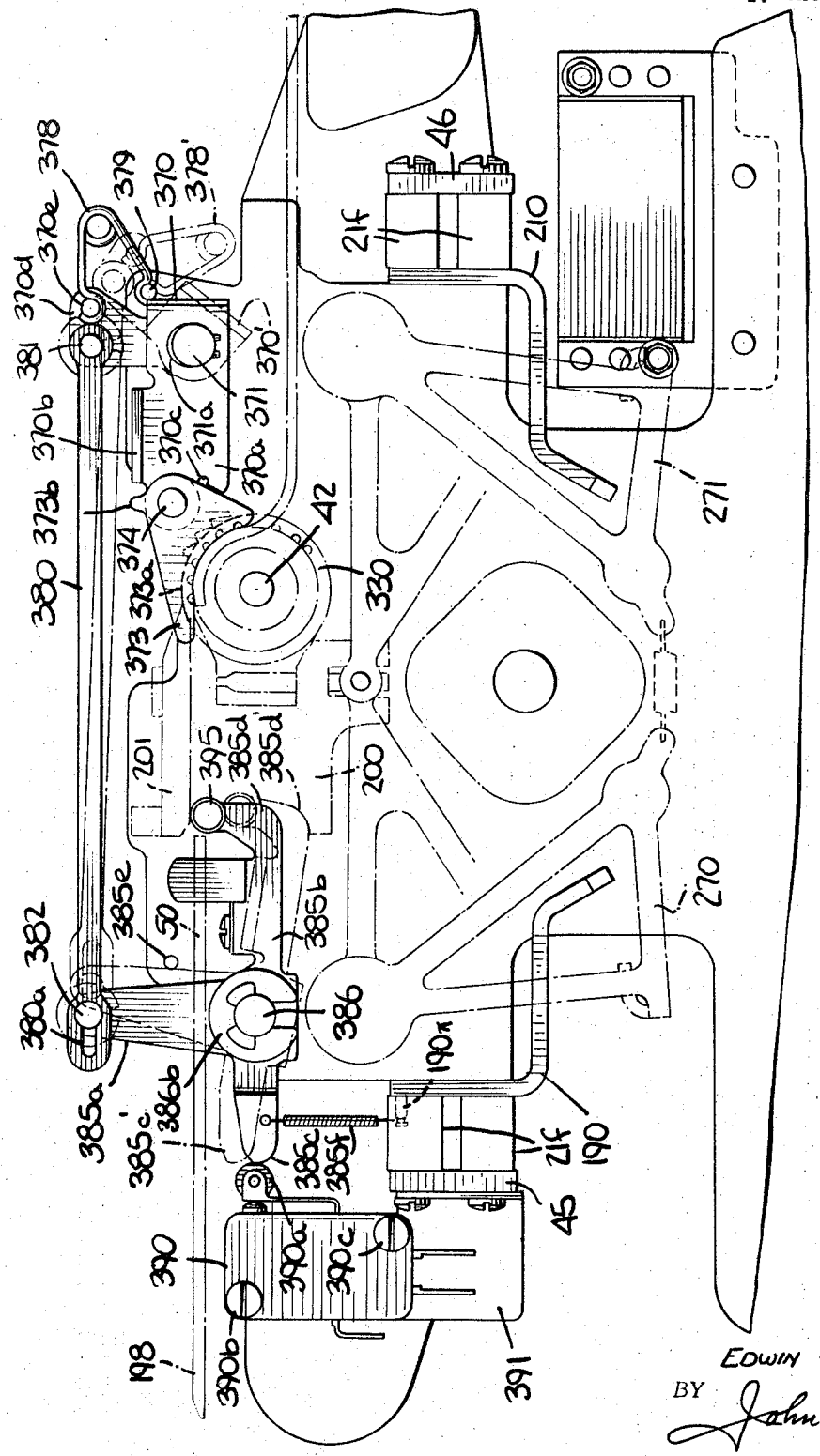

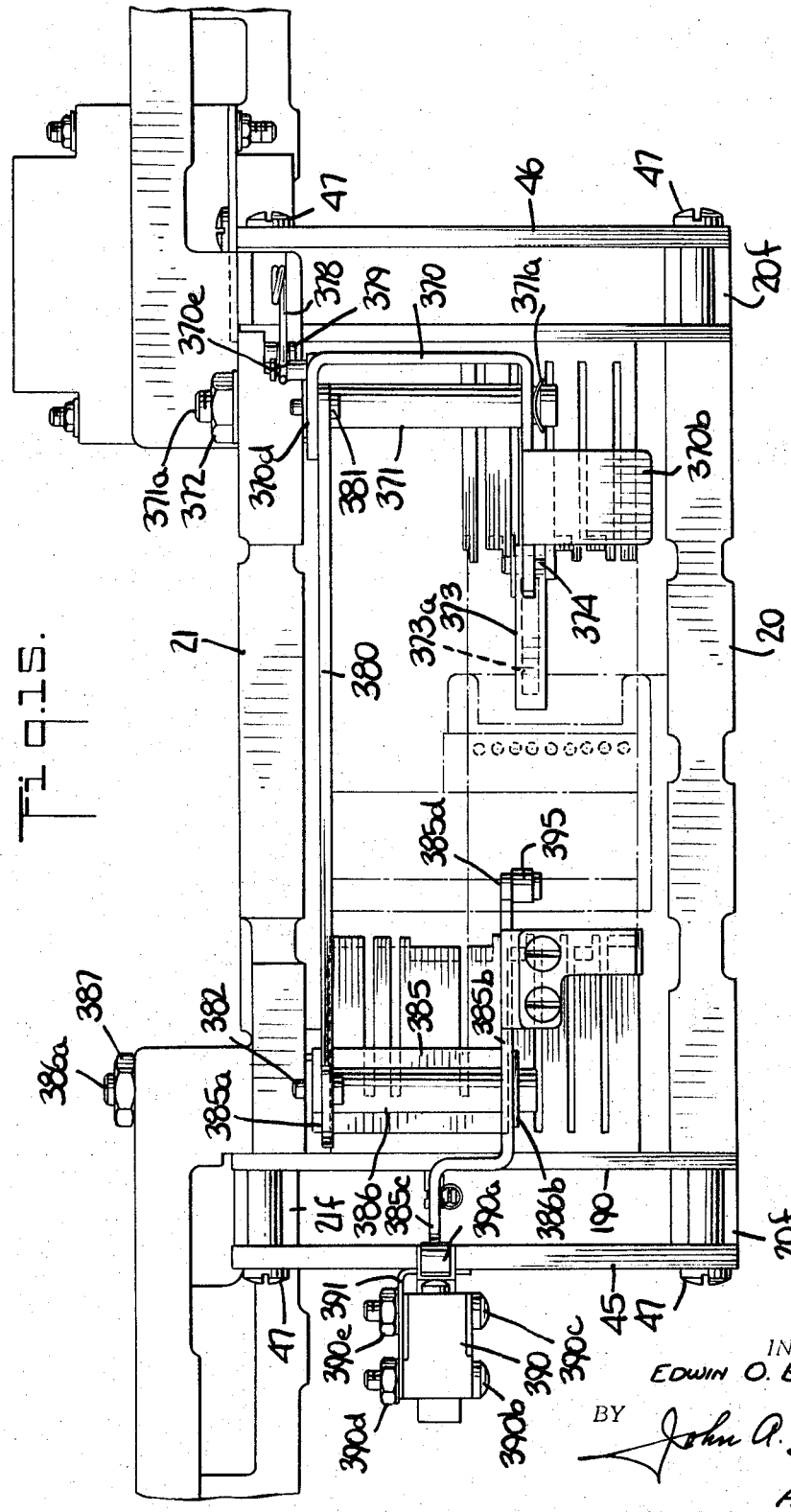

Jan. 30, 1968
E. O. BLODGETT
3,366,322
HIGH SPEED PUNCH
Filed Aug. 10, 1965
13 Sheets-Sheet 11
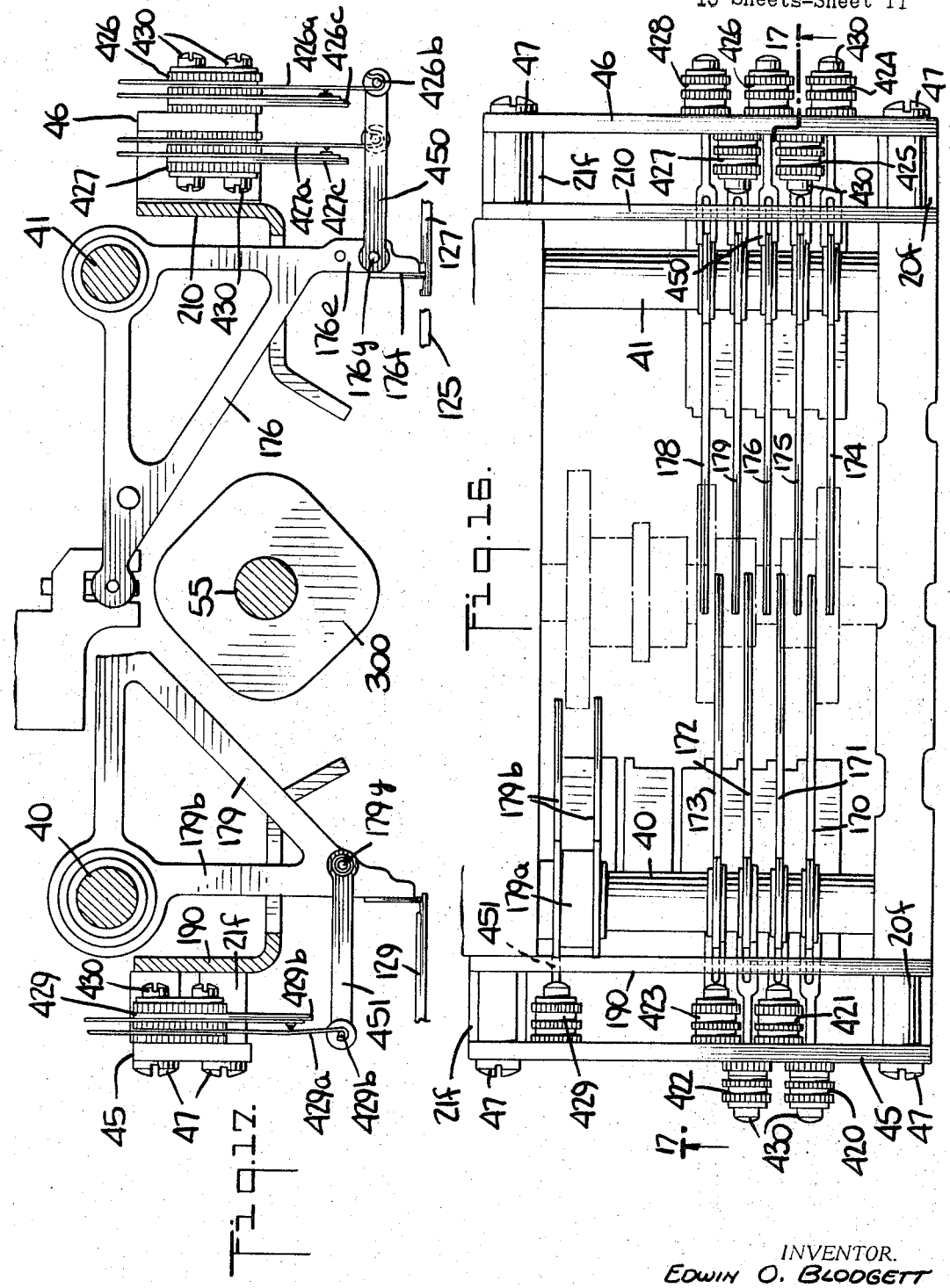
INVENTOR.
EDWIN O. BLODGETT
BY John A. Hardy
ATTORNEY Jan. 30, 1968  E. O. BLODGETT  3,366,322
HIGH SPEED PUNCH Filed Aug. 10, 1965  13 Sheets-Sheet 12

INVENTOR.
Edwin O. Blodgett
BY John A. Harvey
ATTORNEY

Jan. 30, 1968     E. O. BLODGETT     3,366,322
HIGH SPEED PUNCH
Filed Aug. 10, 1965     13 Sheets-Sheet 13
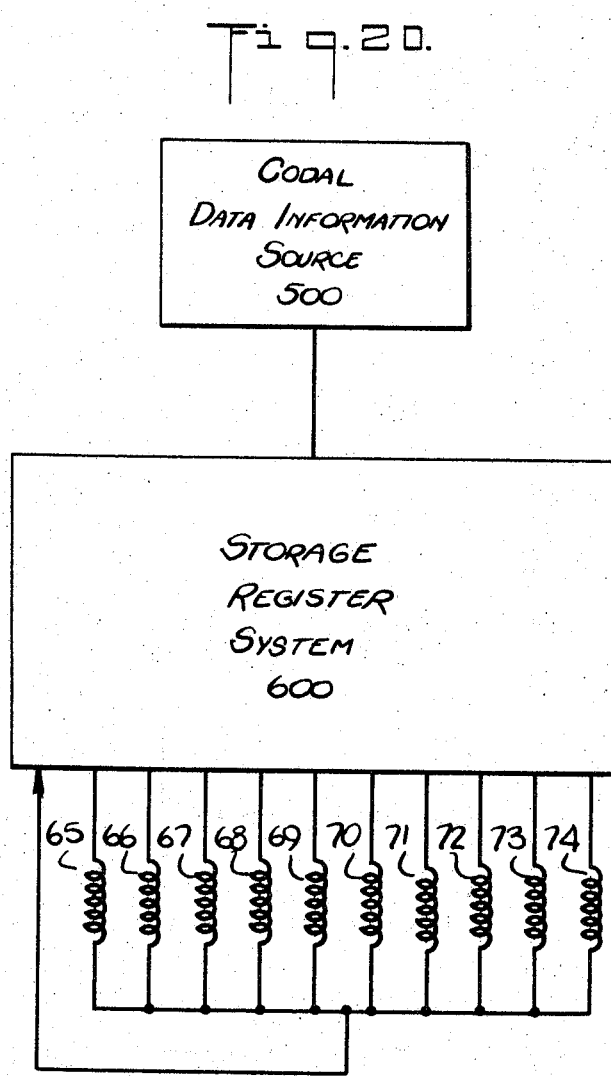
INVENTOR.
EDWIN O. BLODGETT
BY
ATTORNEY United States Patent Office 3,366,322
Patented Jan. 30, 1968

3,366,322
HIGH SPEED PUNCH
Edwin O. Blodgett, Rochester, N.Y., assignor to Friden, Inc., a corporation of Delaware
Filed Aug. 10, 1965, Ser. No. 478,680
14 Claims. (Cl. 234—119)

ABSTRACT OF THE DISCLOSURE

A perforator of the selective-permissive type for encoding intelligence. A feature resides in the controlled motion of the punch elements which are selectively moved to and from their latched and punching positions under the control of a constraining element. The constraint provides accurate control of the punching within the cycle and permits the tape to be advanced prior to punching in each cycle. The constraint also controls the acceleration and velocity of the perforating actuators, thereby controlling the force with which the actuators engage the restrictive elements.

---

This invention relates to data information punched-tape recording apparatus, and more particularly relates to an improved tape punch characterized by an extremely high-speed rate of information recording and by improved operating characteristics.

For convenience, reference herein to tape as a data information recording medium will be understood to be a generic reference applicable to tape conventionally fabricated of paper stock or like thin material, to tabulating cards, and to like forms of perforatable webs. Similarly, reference to tape-punching machines will be understood to be a generic reference to machines for recording data information on such perforatable webs in the form of permutational code perforations therein.

The punches receive an unperforated length of tape and record data information therein by punching permutational code holes aligned in rows corresponding to individual code elements or bits of the code system employed and in columns of information-item code-bit groups recorded in succession along the tape which is advanced in column by column steps. The tape is usually supplied to the punch from a roll of substantial length, but a succession of physically connected and fan-folded tabulating cards may be supplied for edge punching by the punch to provide a conveniently handled record of limited information content as in the Blodgett et al. United States Patent No. 2,905,298. After the recording of data by the tape punch has been effected, the tape may be stored for later use or may be used immediately by a tape reader for print-out of the recorded data or its rerecording in another record medium or other like use.

In prior tape punches of conventional construction, limitation on the speed of information recording has reached the point where little or no improvement can be made by design refinements. The prior structures for perforating tape have principally employed either power driven bails or some form of interposer element for powering the operations of the punch pin actuating mechanism. The punch operation inherently involves reciprocatory drive of the punch pins, and this conventionally requires a mechanical arrangement of elements for translating a rotational drive force to a linear punch-pin actuating force. The required mechanical strength considerations of the various mechanical components which form the punch-pin power-drive structure result in drive components having such large mass that their operational inertia places a distinct limit upon the information recording speed and cannot be further reduced in practice if consistent operation reliability is to be preserved. The high speed punch according to the present invention employs a novel arrangement of parts wherein the punching action is restricted unless specifically permitted, so that ultra-high punching speeds are attained.

Moreover, in prior art construction, whenever a plurality of electromagnets was employed to control a plurality of punches, choice had to be made between narrow electromagnets without skewed or offset linkages to the punch pins, and standard width electromagnets with such linkages. Both alternatives are unsatisfactory, and the high speed punch according to the present invention employs a novel arrangement of parts wherein full-width electromagnets are employed without modification in the outline of the elements between the electromagnets and the punch-pins. This allows optimum electromagnet and punch operation, so that the electromagnets are of the best design proportions despite the necessarily narrow spacing of the column of punch-pins employed therewith.

There is an additional problem which has heretofore prevailed in the use of prior perforating tape punches. This concerns the conventional tape feed structure in which the tape is automatically step advanced after each punch recording of a code-bit group column corresponding to an item of data information. This mode of tape advance is disadvantageous primarily because when ultra-high punching speeds are achieved, such as those now attainable with the present invention, the tape advance under prior constructions introduces delay which now becomes appreciable compared to the new ultra-high punching speeds. The high-speed punch according to the present invention employs a novel arrangement of parts wherein the tape drive is restricted unless specifically permitted, so that ultra-high tape advance speeds are attained.

The prior art tape advance constructions have an additional disadvantage when the tape punch records information manually typed, and the typist makes an error in striking a proper key and realizes it immediately afterward. In these circumstances, the typist has heretofore been required to halt further typing, manually operate a knob on the tape punch provided to turn the tape back to the recorded column containing the error, and then operate a delete key of the typewriter to record a delete code including punching of all the unpunched row-positions in that column so as to cause a tape reader upon subsequently reading the tape recording to recognize that column as a column containing no information. The human operator may then proceed with further typing. This conventional recording-error correction process is not only annoying to the typist, but is time consuming and thus inefficient and tends to distract the typists's attention from the typing task at hand. The high-speed punch according to the present invention completely solves this difficulty by the aforesaid novel arrangement of tape drive parts.

It is an object of the present invention to provide a novel punch structure for perforating tape or the like and one exhibiting substantially improved speed of data-information recording.

Another object of the invention is to provide an improved tape punch for the recording of successive columns of coded data information by use of permutational code-bit perforations, and one characterized by substantially improved speed of punch pin reciprocal actuation in accomplishing punch recording of data information.

A further object of the present invention is to provide a tape punch particularly suited for recording of typed information in that an immediately recognized recording error may be readily and quickly deleted without any need for a manual manipulation to move the tape back to the erroneous recording for purposes of its deletion.

It is a more specific object of the invention to provide a high speed punch in which the tape is advanced just prior to the perforating of intelligence therein.

Another object of the invention is to provide a novel tape punch which not only possesses substantially improved recording speed without sacrifice of operational reliability but at the same time is of lower manufacturing cost with minimized need for service attention over prolonged periods of use.

Other objects and advantages of the invention will appear as the detailed description thereof proceeds in the light of the drawings, in which:

FIG. 1 illustrates an elevational front view in section of a tape punch embodying the present invention in a particular form;

FIG. 2 is a plan view and FIG. 3 is an end elevational view of the structure shown in FIG. 1;

FIG. 4 is a section view of the apparatus shown in FIG. 1 and viewed along the planes 4—4 therein;

FIG. 5 is a bottom view of the punch structure shown in FIG. 1 illustrating the arrangement of the control magnets used therein;

FIG. 6 is a fragmentary elevational section view of the structure viewed along the plane 6—6 of FIG. 2;

FIGS. 7 and 8 are fragmentary detail views of restrictive-latch structures used in the punch herein described;

FIG. 9 is a section view of the punch-pin structure shown in FIG. 6 viewed along the plane 9—9 therein;

FIG. 10 is a detail plan view of the punch die portion of the apparatus shown in FIGS. 2 and 6;

FIG. 11 is a section of tape indicating the code-bit rows and columns used in information recording and including information recorded thereon in the form of permutational code perforations along the rows and columns;

FIG. 13 is a partial detail section view of a tape feed mechanism shown in FIG. 2 and viewed along the plane 13—13 therein;

FIG. 14 is an elevational section view taken along the plane 14—14 of FIG. 2 and showing a tape hold-down structure;

FIGS. 15 and 16 are plan views of certain elements of the punch structure;

FIG. 17 is a section view of certain elements of the structure shown in FIG. 16 taken along the plane 17—17 therein;

FIG. 20 is an electrical schematic of various of the parts of the apparatus.

Figure 12:
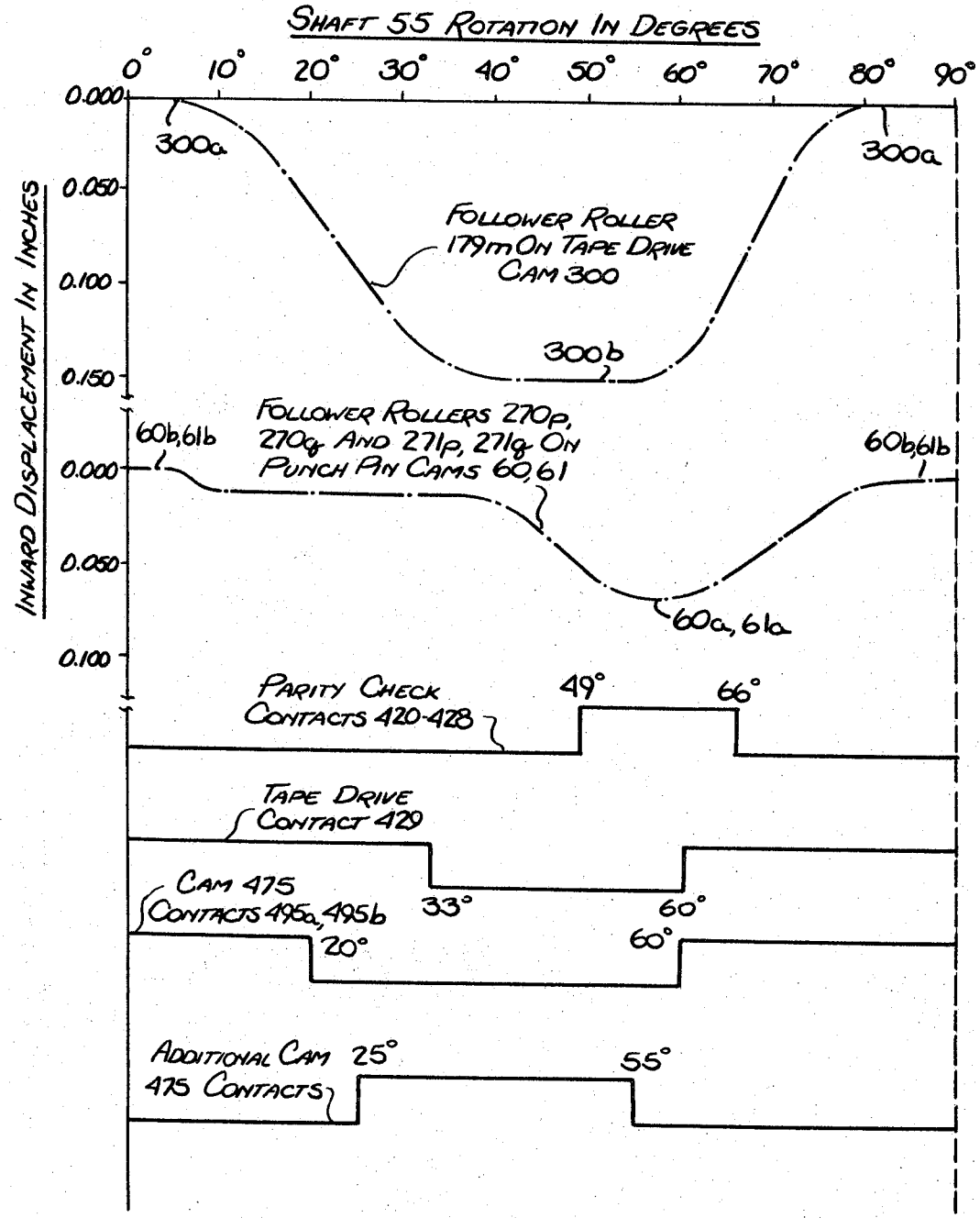
FIG. 12 is a schematic chart showing the timing relationship of various of the parts of the apparatus.

Referring now more particularly to FIGS. 1–4 of the drawings, there is illustrated a high-speed tape punch embodying the present invention in a particular form. The punch conveniently includes an outer cast plate 20 and an inner cast plate 21 spaced therefrom, which together form the main structural basis of the apparatus. The inner plate 21 includes four apertured bosses, three of which appear in FIG. 1 as bosses 21a, 21b, and 21c. These bosses are located at the four corners of plate 21, and provide means for mounting the punch to the main frame of a typewriter or console, or the like. The plates 20 and 21 are rigidly spaced apart by a plurality of rigid spacer bars 22, 23, 24 and 25 and other transverse structural members hereinafter described. Each of these spacer bars is accurately located on the plates 20, 21, at a milled boss thereon, by the use of locating pins (not shown) and is secured by machine screws as illustrated.

The plates 20, 21 are provided with aligned apertures for receiving the ends of shafts 40 and 41, shown in each of FIGS. 1, 2 and 4, which carry certain elements for limited rotational movement thereupon, as described hereinafter. Certain other parts are likewise supported between the spacing plates 20, 21, to provide functions hereinafter described, for example a pair of end comb plates 190 and 210 which are secured to plates 20, 21 by machine screws 47.

The punch includes a rotatable drive shaft 55 having an outer end 56 journaled by ball bearings (not shown) in outer plate 20, an intermediate portion 57 journaled by ball bearings (also not shown) in inner plate 21, and a rear portion 58 extending beyond plate 21. Extended shaft portion 58 is connected to a motor (not shown) which, when energized, continuously rotates shaft 55 at a constant high rate of speed. A plurality of cams are carried by shaft 55 and serve to control various functions described hereinafter. Included among these cams is a pair of punch drive cams 60, 61, having exactly aligned and matching cam surfaces, and carried by shaft 55 for rotation therewith.

As is best shown in FIGS. 1 and 5, nine punch control electromagnets 65–73 are secured in vertical aligning slots in the spacer bars 22–25 and are generally of conventional construction. For example, electromagnet 66 is provided with a U-shaped magnetic pole bracket 78 which is secured by machine screws 140 to the associated spacer bar 22. Similarly, electromagnets 65 and 67–73 include respective U-shaped magnetic pole brackets 79 and 80–86. The electromagnet 66 includes a central magnet pole, as for instance the pole 66a (and the electromagnets 65 and 67–73 have similar magnetic poles 65a and 67a–73a) and one arm of the bracket 78 has secured thereto a pivot bracket 105 which in turn supports for pivotal motion thereon an armature 120 including a reduced-width end 120a shaped to provide a restrictive-latch, an intermediate portion 120b overlying the central pole 65a, and a notch 120c at the remote end of the armature 120 on the opposite side of pivot bracket 105. Secured to the outside surface of the spacer bar 22 by one of the screws 140 is an anchor bracket 150 having a curved upper end 150a. A tension spring 160 extends between notch 120c of the armature 120 and curved upper portion 150a of anchor bracket 150, so as to bias the armature 120 away from the pole 66a and into engagement with the end of an individual punch-pin actuator presently to be described.

As shown more clearly in FIG. 5, the electromagnet 66 is in a row of two with an electromagnet 65. An armature 121 of electromagnet 65 includes a reduced width end 121a. The armatures 120, 121 extend in a single direction, and their ends 120a, 121a are aligned, as indicated in broken lines in FIG. 2. The electromagnets 67 and 68 are similarly supported on the spacer bar 23 in a second row (FIG. 5) but in staggered relation to the electromagnets 65 and 66 as shown, and their respective armatures 122, 123 extend in a second direction opposite to that of armatures 120, 121. The reduced-width ends 122a, 123a are aligned with one another and extend beyond the ends of the armatures 120 and 121. The result is that the end portions 122a, 123a of the armatures 122, 123 lie in a single line (FIG. 2) with the end portions 121a, 120a of the armatures 121, 120. The staggering of the four electromagnets 65, 66, 67 and 68 thus results in the staggering of their reduced-width ends 120a, 121a, 122a and 123a along the aforesaid line. Each one of the ends 120a–123a may thus be pivoted upwardly and downwardly without interference from the other of the ends in that line.

Similarly, the electromagnets 69 and 70 are supported on the spacer bar 24 and arranged in a third row (FIG. 5) and have their reduced-width ends 124a, 125a of their armatures 124, 125 aligned and extending in a single direction, while the electromagnets 71, 72 and 73 are supported on the spacer bar 25 and are arranged in a fourth row staggered in relation to the electromagnets 69 and 70 and with their reduced width ends 126a, 127a and 128a of their armatures 126, 127 and 128 extending in a direction opposite to the direction of ends 124a, 125a. The five reduced-width ends 124a through 128a of the respective armatures 124 through 128 are thereby arranged in a single line similar to the other line previously described, and as indicated in broken lines in FIG. 2. The staggering of the five electromagnets 69–73 staggers their five ends 124a–128a so that each is free to pivot upwardly and downwardly without interference from the other of the ends in that line.

As indicated in FIGS. 2 and 5, the electromagnets 69–73 are not only supported on their associated spacer bars 24 and 25 in group staggered relation as just explained, but all of these electromagnets as a composite group have a similar staggered relationship to the electromagnets 65–68 considered as a composite group. This permits the use of standard width electromagnets 65–73 despite the closer spacing of the punch pins (to be presently described) which the electromagnets control. This feature of the invention will be pointed out further hereinbelow. In general however, this arrangement allows electromagnets of four times the width possible in a single line of electromagnets, and without the disadvantageous resort to bent or skewed linkages.

As aforesaid, each of the armatures 120 through 128 (associated with respective electromagnets 65 through 73) is provided with a spring and anchor bracket corresponding to those already described with respect to armature 120 and electromagnet 66, so that the various armatures are correctly pivoted and spring-loaded. Specifically, the spring and anchor brackets for electromagnet 65 are shown in FIG. 3, all the springs and anchor brackets in the first row (electromagnets 65, 66) thus being shown. In each of the other three rows only the frontmost electromagnet springs and anchor brackets can be seen (FIG. 1). Thus with respect to electromagnets 66, 68, 69 and 71, there are shown respective springs 160, 162, 163 and 164 and anchor brackets 151, 152, 153 and 154. It will be appreciated that each of armatures 120 etc. is spring biased upwardly at its end 120a etc. by the spring 160 etc. associated therewith, and may be drawn downward against this bias by energization of the electromagnet 66 etc. associated therewith. This upward and downward movement of ends 120a etc. is utilized for blocking and unblocking the motion of punch pin actuators to be described immediately hereinbelow. Energization of any of electromagnets 66 etc. thus acts to move the corresponding ends 120a etc. out of the path of their associated punch pin actuators (i.e. to the permissive position), to permit such punch pin actuators to move in the punching direction, and such armatures are thereafter restored upwardly by spring bias to their restrictive position.

As is best shown in FIGS. 1, 3 and 4, four punch pin actuators 170, 171, 172 and 173 are journaled for angular rotation on shaft 40. Each of these four punch pin actuators corresponds to and is aligned along shaft 40 with the center of corresponding ones of the ends 120a, 121a, 122a and 123a of the electromagnet armatures 120 etc., in order to have its movement in the punching direction permitted or restricted thereby, as hereinafter described. Each of the four punch pin actuators has the configuration of that shown for actuator 170 (FIG. 1), and is arranged for rotation within the same angular limits on shaft 40.

As is principally shown in FIG. 1, with certain details shown in FIGS. 4 and 6, punch pin actuator 170, which is exemplary of the four punch pin actuators, includes a collar 170a (FIG. 4) journaled upon shaft 40 for rotation thereon, and a pair of arms 170b and 170c which extends respectively in vertically downward and horizontal directions. Horizontal arm 170c is terminated at the end thereof furthest from shaft 40 by a cylindrical end portion 170j (FIG. 6) which is provided with a central aperture 170m. Each cylindrical end, such as 170j, is thereby effective to actuate a punch pin to effect perforations along a single row in the tape, as will presently be described. An integral brace 170d connects the ends of arms 170b and 170c to rigidify them, thus giving the punch pin actuator a generally triangular outline. At the lower end of arm 170b is a flared portion 170e. Carried by flared portion 170e is a generally triangular restrictable member 170f (FIGS. 1 and 3) affixed to flared portion 170e at the lowermost extreme thereof, with the plane of restrictable member 170f disposed vertically and at right angles to the plane of flared portion 170e. Restrictable member 170f has the lower edge thereof disposed slightly below the lowermost end of flared portion 170e, in order to engage the restrictive-latch provided in the end 123a of the armature 123 in a manner to be hereinafter described. Actuator 170 carries a hole 170g at the flared portion 170e, and a hooked end of a tension spring 180 is engaged with the hole 170g to bias the actuator 170 in the counterclockwise direction, as seen in FIG. 1. Each of the actuators 171, 172 and 173 includes parts corresponding to those just described, and all four such actuators are journaled on the shaft 40.

Figure 18:
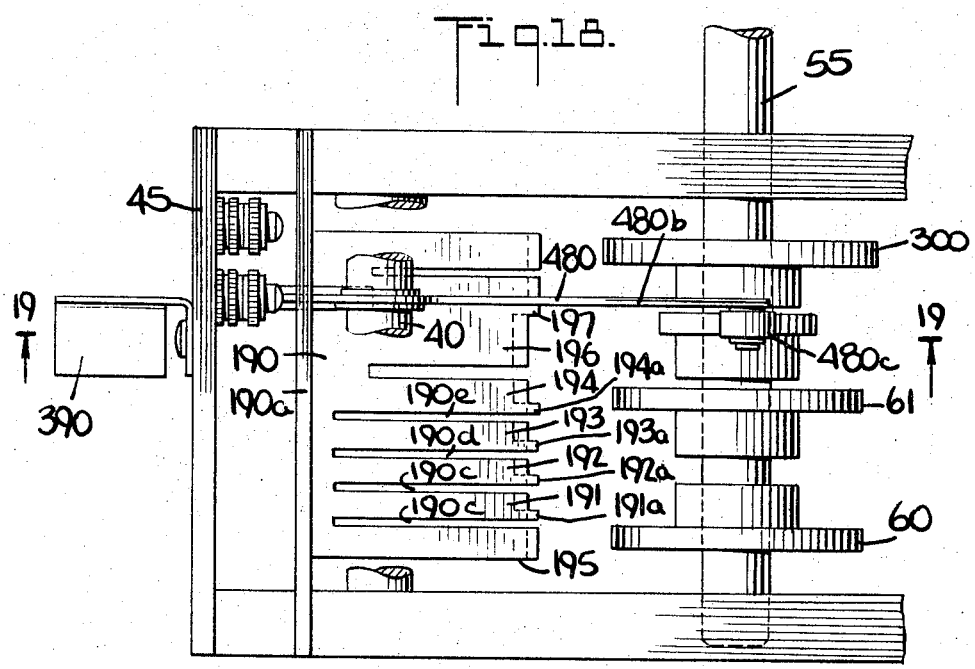
FIG. 18 is a partial detail view of auxiliary control means used in a punch embodying the invention.

The comb 190 is generally of S cross-section and extends transversely of and is affixed by machine screws 47 at an upper portion 190a thereof to the plates 20 and 21. It includes a plurality of narrow slots forming a plurality of teeth 191, 192, 193 and 194 (FIG. 18), which define, with comb portions 195 and 196, four slots 190b, 190c, 190d and 190e, for the reception of actuators 170 through 173, respectively. In FIG. 1 it may be seen that comb portion 195 lies in front of actuator 170, and FIGS. 3 and 18 illustrate that the end portion of each tooth has been notched to provide an anchor projection 191a–194a engaged by the other eyed end of the punch pin actuator springs such as shown for anchorage of spring 180 on the end 191a of comb tooth 191 (as indicated by the cut-away section in FIG. 1) which lies just behind actuator 170. In addition to fixing the second end of spring 180, the slots in the comb portions 195 and 196 act to guide the actuator 170 during its limited rotational movement. Each of ends 192a, 193a and 194a of comb teeth 192, 193 and 194 anchors one end of a spring (not shown) corresponding to spring 180, the other ends of which are affixed to pins corresponding to hole 170g, on the other three actuators on shaft 40, i.e. actuators 171, 172 and 173 respectively. Each of the actuators on shaft 40 is thereby biased to rotate in the counterclockwise direction, as viewed in FIG. 1, when it is so permitted by the armature associated therewith. Such counterclockwise rotation drives the horizontal arm, e.g. arm 170c, of the permitted actuator upward, driving the cylindrical end portion, e.g. end 170j, upward therewith.

Five similar actuators 174, 175, 176, 177 and 178 are journaled upon the shaft 41, and are of the same general outline and construction as the four actuators already described with reference to shaft 40, except that these actuators are reversed on shaft 41 so that the two groups of actuators face each other as shown in FIG. 1. Each actuator of this group of five is aligned along shaft 41 with one of the reduced width ends of armatures 124 through 128. Specifically, actuator 174, which is exemplary of the group of five, includes a collar 174a (FIG. 4) journaled upon the shaft 41 for rotation thereon, a vertical arm 174b, a horizontal arm 174c terminating in a cylindrical end 174j, having a central aperture 174m, a brace 174d, a flared portion 174e carrying a restrictable member 174f, and a hole 174g connected to a tension spring 185, all corresponding to parts already described with reference to actuator 170. A comb 210 is similarly affixed by machine screws to plates 20, 21 at upper portion 210a, and includes a comb portion 211 which is broken away in FIG. 1 to show tooth 212. Spring 185 is attached to lower end 212a of tooth 212, thereby to bias actuator 174 for movement in the clockwise direction, as viewed in FIG. 1. Comb 210 corresponds to comb 190, and includes an additional number of teeth sufficient to accommodate and guide actuators 175 through 178, in the manner and for the purpose already described with reference to comb 190 and actuators 171 through 173. Actuators 175–178 include parts corresponding to those just described with reference to actuator 174, and the five actuators are journaled on shaft 41. Each actuator is provided with a spring (not shown) corresponding to spring 185, for biasing that actuator to rotate in the clockwise direction, as viewed in FIG. 1, when it is so permitted by the armature associated therewith. The horizontal arm (e.g. arm 174c) of that actuator is thereby driven upward, carrying the cylindrical end (e.g. end 174j) upward with it.

The specific permissive and restrictive relationship of the restrictive-latch ends of the electromagnet armatures 120–128 to the restrictable members 170f–178f of the actuators 170–178 will now be described with reference to FIG. 1 and the enlarged fragmentary views of FIGS. 7 and 8. As previously mentioned, the actuators carried on shaft 40 are urged to move in counterclockwise rotation by the springs associated therewith, e.g. spring 180, while the actuators on shaft 41 are urged to move in clockwise rotation by the springs associated therewith, e.g. spring 185. Additionally, the armatures associated with alternate actuators on shaft 40 (120 and 121) are positioned outwardly, while the other armatures (122 and 123) associated with the remaining actuators are positioned inwardly, of the associated line of armature ends 120a, 121a, 122a, 123a (by inwardly is meant, with regard to the actuators on shaft 40, the direction in which springs 180 etc. urge restrictable members 170f etc.). Finally, the armatures associated with alternate actuators on shaft 41 (126, 127 and 128) are positioned outwardly, while the other armatures associated with the remaining actuators (124 and 125) are positioned inwardly, of the associated line of armature ends 124a, 125a, 126a, 127a, 128a (here again by inwardly is meant, with regard to the actuators on shaft 41, the direction in which springs 185 etc. urge restrictable members 174f etc.). These conditions combine to present only two possibilities for all the actuators on both shaft 40 and shaft 41: the restrictable member 170f etc. of an actuator either is urged by the spring bias thereon to move from the end 120a etc. of an armature 120 etc. toward the main portion of that armature, or is urged to move from the end 120a etc. away from that armature altogether. This will become more clear as the two types of restrictive-latch configurations used with these two possibilities are described immediately hereinbelow.

As shown in FIG. 7, a first type armture end has a restrictive-latch configuration which is exemplified by the end 123a of the armature 123. This type of restrictive-latch is designed for engagement with a restrictive member (e.g. 170f) which moves toward the main body of the armature when so permitted as indicated by the horizontal arrow. Thus it may be seen in FIG. 1 that restrictable member 170f of actuator 170 moves toward the main body portion of armature 123 when actuator 170 is unrestricted by armature end 123a and urged in the counterclockwise direction by spring 180. The configuration of the restrictive-latch provided in the end 123a shown in FIG. 7 is employed on each of the armatures associated with electromagnets 67, 68, 69 and 70. All of these armatures, i.e. armatures 122, 123, 124 and 125, are characterized by the aforesaid fact that the actuator restrictable portions which they are adapted to restrict or permit, move toward the main body of each associated armature to effectuate punching. This restrictive-latch configuration includes a first horizontal step surface 123d upon which the end edge of restrictable member 170f is abutted when the parts are in the illustrated restrictive condition. A first vertical surface 123e completes the first step portion, and acts to restrict the restrictable member 170f against movement in the counterclockwise direction indicated by the arrow in FIG. 7 when the parts are in the illustrated restrictive condition. A second horizontal step surface 123f provides a surface across which the end edge of restrictable member 170f may move after the restrictive-latch end 123a of the armature 123 has been moved downwardly (as indicated by the vertical arrow in FIG. 7) to change the parts from the restrictive to the permissive condition. The length of horizontal surface 123f will be determined by the amount of rotation of the associated example actuator 170 required to effectuate punching as hereinafter described. The second step is terminated by a second vertical step surface 123g which has no significance in the operation, the surface 123g being the result of machining the surface 123f to the proper finish and depth. As will be appreciated, when restrictable member 170f is returned a sufficient distance in the clockwise direction, it will once again be presented for restrictive blocking by surface 123e of the restrictive-latch in the armature end 123a. As will appear hereinafter, this restrictive engagement by restrictive-latch end 123a may or may not be effected when the restrictable member 170f is so presented, depending upon the selection of the specific actuators that are to be permitted and restricted during a given punching cycle.

In FIG. 8 is shown the second type armature end configuration, which is employed on armatures 120, 121, 126, 127 and 128. Armature 126 is exemplary of this group, and end 126a of armature 126 has a restrictive-latch configuration illustrated in FIG. 8. As may be seen in FIG. 1, armature 126 is associated with electromagnet 71, and restrictable member 174f of the associated actuator 174 when so permitted moves in the clockwise direction indicated by the horizontal arrow under the urging of spring 185, thus moving away from the main body portion of armature 126. Each of the aforesaid armatures 120, 121, 127 and 128, also has this same relationship to the restrictable member of their associated actuator. As shown in FIG. 8, the configuration of the restrictive-latch in the end 126a, and consequently the configuration of each of ends 120a, 121a, 127a and 128a, includes a first horizontal surface (e.g. 126d), followed by a first vertical surface (e.g. 126e), and then a second horizontal surface (e.g. 126f). The lower edge of the associated restrictable member (e.g. 174f) is, when restricted as illustrated, abutted against the first horizontal surface (e.g. 126d), and restricted by first vertical surface (e.g. 126e) against motion in the clockwise direction (as shown by the horizontal arrow in FIG. 8) due to the urging of the associated spring (e.g. 185). When the restrictive-latch end (e.g. 126a) is moved downwardly (as indicated by the vertical arrow in FIG. 8) to its permissive position, the associated restrictable member (e.g. 174f) is free to travel across the second horizontal surface (e.g. 126f), which is sufficiently long to allow that degree of rotation of the actuator (e.g. 174) required to perform a punching operation, as described hereinafter. The second vertical surface (e.g. 126g) has no significance for the operation of the apparatus, and is the result of machining to provide the proper depth and finish for the first horizontal surface (e.g. 126d). When the restrictable member (e.g. 174f) is returned a sufficient distance in the counterclockwise direction, it will be presented for restrictive blocking by the upward return of the restricting vertical surface (e.g. 126e) with its armature end (e.g. 126a). This restrictive blocking may or may not be effected when the restrictable member is so presented, depending upon the selection of the specific actuators that are to be permitted or restricted during a given punching cycle, as hereinafter explained.

It will now be appreciated that when any of the electromagnets, for example electromagnet 68, is energized the armature associated therewith is drawn downward by the attractive force of the electromagnet on the armature. This armature motion removes the restrictive-latch on the armature from the path of the restrictable member on the actuator, for example by removing vertical surface 123e of armature 123 downwardly out of the path of restrictable member 170f of actuator 170. The actuator which is so permitted, may then move in the direction of the arrow (FIGS. 7 and 8) a short distance under the urging of the associated spring and under the control of a bail bar (to be presently described) which is cam operated. When the restrictable member has moved forward this short distance it is not subject to further restriction by the restrictive-latch surface (e.g. 123e) until the termination of that punching cycle. This will be more fully described hereinafter.

The aforesaid punch pins with which the cylindrical actuator ends (for example the end 170j) cooperate will now be described. A die block 200 is shown in FIGS. 1, 2, 3 and 6 in assembly, and in FIGS. 9 and 10 in detail. A die assembly 200 is mounted to inner plate 21 by a pair of screws 200a (FIG. 2) which extend into a lower guide portion 202 (FIGS. 1 and 6) thereof in tapped holes 200b, 200c, and is mounted to outer plate 20 by a pair of screws 200d (FIG. 2) also in tapped holes 200b, 200c. Two pairs of die block locator pins 200f and 200g (FIG. 2) pin die block assembly 200 to inner plates 20 and 21 respectively, to locate it precisely relative to the other parts of the apparatus. A die 201 is mounted on top of guide portion 202 by (FIG. 10) three locator pins 200j, 200m and 200p, and a pair of screws 200h and 200i. The forward end portions of the lower guide portion 202 and the die 201 are spaced to provide a horizontal slit 203 (FIGS. 6, 9 and 10) which is sufficiently wide and deep to accommodate a tape 50 for free sliding motion therethrough, as illustrated in FIG. 6, the bottom surface of the slit being coplanar with a table plate 198 secured by integral depending flanges 199 between the outer and inner plates 20 and 21. A vertical slot 204 (FIGS. 6 and 10) appears in the die block assembly 200 for a purpose hereinafter explained.

The guide portion 202 acts as a punch pin guide, and includes (FIG. 9) nine lower pin guide apertures such as aperture 202a, and nine upper pin guide apertures such as 202b coaxially aligned with the associated aperture 202a. Nine punch pins 217 through 225 are engaged within these guide pin apertures for reciprocal upward and downward motion therein. Punch pin 217, which is exemplary of all nine, has a lower portion 217a, engaged for slidable movement within aperture 202a in the lower portion of die block portion 202, and an upper portion 217b having a reduced diameter relative to said first portion, disposed for slidable movement within aperture 202b of the upper portion of die block portion 202.

As best shown in FIGS. 9 and 10, the nine punch pins 217 etc. are arranged in a straight line transverse to the direction of feed of tape 50 (FIG. 6). The die 201 includes nine small diameter die holes such as 227, which are exactly aligned, by virtue of locator pins 200e, 200f and 200g, with the punch pins 217, etc. on the other side of slit 203. These die holes are close fits for the corresponding punch pin upper portions such as the portion 202b. A larger diameter extension of each of these die holes, such as 227a, continues upwardly to an egress at the upper surface of die 201. The punch pin 222 is aligned with slot 204 as shown in FIG. 10 and, as illustrated in FIG. 11 showing a short length of punched tape 50, is employed to punch the smaller diameter tape drive holes TDH. Its upper portion 222b is accordingly smaller in diameter than the corresponding portion of the other punch pins, and the upper guide aperture in block portion 202 and the die hole 232 are also correspondingly smaller in diameter.

Die 201 includes a rectangular raised portion 201a (FIGS. 9 and 10), centered on the column of apertures 227a etc., which acts to receive a hood 250, best seen in full outline in FIG. 6. Hood 250 is secured to die block assembly 200 by a screw 252 (FIG. 1) extending through a lateral extension 251 thereof, and into screw hole 201f (FIG. 10) in die 201 but not so deep as to enter slit 203.

Hood 250 includes a chute 253 which internally communicates therewith and which leads to a chad hopper (not shown) below the apparatus. Thus the punched-out chad 50x of tape 50 is collected by the hood 250 and falls by gravity through chute 253 to the chad hopper for collection and discard.

Each of the punch pins is provided with a slot, for example the slot 217c of the punch pin 217, adapted to receive the cylindrical end of the corresponding actuator such as the end 170j of the actuator 170 associated with the punch pin 217. Each of the nine punch pins is connected to individual ones of the aforesaid cylindrical ends 170j through 178j by an individual pin 217m–225m received in the actuator apertures 170m–178m, respectively. As the actuator ends 170j–178j are selectively driven upward and downward by reciprocal limited rotation of the actuators associated therewith, the associated punch pins 217–225 will be driven selectively upward and downward within die block guide portion 202 sufficient to enter the associated die holes of the die 201, thereby punching the tape 50 overlying the punch pins within slit 203. By proper selection of the actuators 170–178 that are driven upward at ends 170j–178j, any desired combination of perforations may be effected in a column across tape 50 by actuation upward of the corresponding ones of punch pins 217–225.

It will now be appreciated that each of actuators 170 etc., by being arranged alternately along shafts 40, 41, are spaced apart by twice the distance of punch pins 217 etc. Similarly, the electromagnets 65 etc. by being arranged in two rows along each of shafts 40, 41 are spaced apart by twice the distance of actuators 170 etc., or four times the distance of punch pins 217 etc. Thus, the staggered arrangement of electromagnets 65–73 staggers the actuators 170–178 associated therewith, so that normal width electromagnets may be employed with the closely spaced punch pins 217 etc. but without bends or skewing in the linkages connecting the electromagnets and the punch pins. This allows heavier duty and more economical electromagnets to be employed, without the introduction of reliability-decreasing skewed linkages.

Referring now to FIGS. 1 and 4, shafts 40 and 41 carry actuator control bails 270 and 271 respectively. Bail 270 includes a pair of spaced downwardly descending triangular bell cranks 270a and 270b, while bail 271 includes a pair of spaced downwardly descending triangular bell cranks 271a and 271b. The four bell cranks 270a, 270b and 271a, 271b, are identical in outline. The pair 270a, 270b is however reversed on shaft 40 relative to the pair 271a, 271b on shaft 41, so that the pairs face one another. The pairs are aligned on their respective shafts, so that bell crank 270b is rotationally aligned with bell crank 270a, and so that bell crank 271b is rotationally aligned with bell crank 271a.

The outline of the two pairs of bell cranks will now be described, with particular reference to one bell crank of each pair. Bell cranks 270a and 271a each include, respectively, a downwardly disposed arm 270c, 271c, a generally horizontally disposed arm 270d, 271d, and a brace 270e, 271e connecting the extremes of the arms 270c, 270d and 271c, 271d to form the general triangular configuration and rigidify the bell cranks 270a, 271a. Each of the four bell cranks includes a collar. Specifically, bell cranks 270a, 270b include collars 270f, 270g journaled on shaft 40, and bell cranks 271a, 271b include collars 271f, 271g journaled on shaft 41. At the lower ends of bell crank arms 270a, 270b, a bail bar 270m extends between the pair of bell cranks and is secured to or integrally formed with each. Bail bar 270m thereby lies directly below shaft 40, and along the line of armature ends 120a through 123a (FIGS. 1 and 4). Bell cranks 271a, 271b are provided with an identical bail bar 271m, which thereby lies along the line of armature ends 124a through 128a.

Bail bars 270*m* and 271*m* are at the correct distance from shafts 40, 41 respectively, to intercept, respectively, the line of actuator restrictable members 170*f*, 171*f*, 172*f*, 173*f*, and the line of actuator restrictable members 174*f*, 175*f*, 176*f*, 177*f*, 178*f*. It is the bail bars 270*m*, 271*m* that control the movement of the permitted actuators in the punching direction under the urging of their associated springs, and it is also the bail bars 270*m*, 271*m* that reset the actuators to the position where they are presented for restriction by their associated armature restrictive-latch ends 120*a* etc. The precise manner of this actuator control and reset by bail bars 270*m*, 271*m* will be more fully described immediately hereinbelow in connection with the means for reciprocally driving bails 270, 271.

The pair of bell cranks 270*a*, 270*b* of bail 270 carries a pair of cam follower rollers 270*p* and 270*q* rotationally journaled on pins 270*r* and 270*s* secured respectively at the flared junction of arms 270*d*, 270*e* of bell crank 270*a* and at the flared junction of the corresponding arms of bell crank 270*b*. Similarly, bell cranks 271*a*, 271*b* of bail 271 rotationally support respective cam follower rollers 271*p*, 271*q*. The two pairs of bell cranks 270*a*, 270*b* and 271*a*, 271*b* are spaced apart sufficiently so that cam follower roller pairs 270*p*, 270*q* and 271*p*, 271*q* are respectively engageable with the cam surface of punch drive cams 60 and 61 fixedly secured on the drive shaft 55 with the contact of the rollers on each of cams 60, 61 being exactly 90° apart, for a purpose to be hereinafter explained. As has already been mentioned, cams 60 and 61 have identical and aligned cam surfaces. The use of a pair of cams and a pair of bell cranks and cam follower rollers in this manner is employed only to minimize flexure of the associated bail bars 270*m* and 271*m*. As is best shown in FIG. 1, each of bell cranks 270*a*, 271*a* includes a lip 270*t*, 271*t*, respectively. A tension spring 290 is engaged with each of extension lips 270*t* and 271*t* to urge the bell cranks 270*a* and 271*a* toward one another so that cam follower rollers 270*p*, 271*p* are biased against the cam surface of punch drive cam 60. The bell cranks 270*b* and 271*b* are provided with similar parts and are connected with a similar spring (not shown), thereby to bias the associated cam follower rollers 270*q*, 271*q* against the cam surface of punch cam 61. The bails 270, 271 are thus forced to follow each of the identical punch drive cams 60, 61. As will be pointed out in detail immediately hereinbelow, bails 270, 271 are thereby moved in angularly reciprocating motion on shafts 40, 41 and are effective to control the motion of the actuators in their punching direction, as well as to drive the actuators back to the reset position at the line of armature ends upon termination of each punching motion. It will be appreciated that any actuator that is unrestricted by its restrictive-latch armature end, is biased to ride against its bail bar 270*m*, 271*m* by virtue of the large bias force exerted by the tension springs 180 and 185 individual to each actuator.

Thus, the bail bars 270*m*, 271*m* control the motion of the various actuators during any period when they are unrestricted by their associated restrictive-latches, whether that control consists of controlling the punching motion of the actuators under the spring bias, or consists of driving the actuators back to the reset position against that spring bias. The only time the actuators are not spring biased against the bail bars, is when they are restricted from punching motion by the condition of their associated restrictive-latches. In that case they are left behind at their restrictive-latches during the next cycle of bail bar travel. Permitted actuators thus follow the bail bar and cause corresponding punched apertures in that punch cycle, while restricted actuators are left behind and do not follow the bail bar and do not cause a corresponding punched aperture. Selection of the restrictive-latches that are rendered permissive in a given punch cycle thus selects the code positions that are punched in a single column during that punch cycle.

Punch drive cams 60 and 61 have the same outline and are aligned on shaft 55, as aforesaid. Each of cams 60, 61 includes four identical and serially repeating portions angularly centered 90° apart. Referring to FIG. 12, the response of the follower rollers 270*p*, 270*q* and 271*p*, 271*q* to the outline of the timing chart shows punch pin cams 60, 61 as a function of angular motion of shaft 55, i.e. as a function of time since the shaft 55 is driven at constant speed. The scale of displacement will, of course, vary with the size of the cams 60, 61 which are employed. The scale shown is for illustration only. Only one of the repetitive portions of cams 60, 61 is represented by the timing chart. The 90° portion shown is repeated three more times during each shaft 55 revolution, thus giving four punching cycles per shaft revolution. The pairs of cam follower rollers 270*p*, 270*q* and 271*p*, 271*q* are spaced apart exactly 90° on the surfaces of cams 60, 61 so that they are contacting similar portions of the cam outline at every instant, thus accounting for the single curve of follower roller response (FIG. 12) to cams 60, 61.

The first 39° of cam 60, 61 periphery in any quadrant, e.g. from 0° to 39° in FIG. 12, includes an initial outline portion which causes dwell of the cam followers for 5° at a cam surface high point 60*b*, 61*b*. The parts are so proportioned that this high point 60*b*, 61*b* holds the bail bars 270*m*, 271*m* at the extreme of their reset position so that they hold all the actuators 170–178 0.010 inch beyond the restrictive point; that is to say, during that 5° of cam travel the actuators 170–178 have their respective restrictable members 170*f*–178*f* held 0.010 inch beyond the vertical surfaces 120*e*–128*e* of the respective restrictive-latches. Accordingly any armature that is depressed by energization of its electromagnet during this 5° of cam travel, will not have to overcome any frictional forces of engagement between the associated vertical surface (e.g. 123*e*) of the restrictive-latch end of that armature and the associated restrictable member (e.g. 170*f*). At the termination of the aforesaid 5° dwell at high point 60*b*, 61*b* the cam follower rollers drop with the cam surface during 16° of cam travel to an 18° plateau. During this 16° of cam travel, the bails move past the restrictive-latch vertical surfaces 120*e*–128*e* in the punching direction. This results in either of two actions.

First, if any armature is depressed by energization of its associated electromagnet when the bail bar passes the restrictive-latch in the punching direction, the restrictable member of the corresponding punch pin actuator will follow the bail past the vertical surface (e.g. 123*e*) thereof to dwell thereafter against the bail awaiting the punching portion of the cycle. This means that any immediate release of the armature by the electromagnet after the latch passes the keeper notch cannot be effective to restrict the actuator, and the actuator must follow the bail through the succeeding punching motion. Second, if on the other hand any armature is not depressed when the bail bar passes the vertical surface of the restrictive-latch in the punching direction, the corresponding restrictable member will engage the associated restrictive-latch vertical surface (e.g. 123*e*) and be restricted thereby as the bail passes the restrictive latch.

The 16° of cam travel, wherein the bail bars pass the restrictive-latches thereby acts to sample the condition of the restrictive-latches at that time, and to record the fact of that condition in the aforesaid manner. At the end of the 16° of cam travel, the cam followers dwell upon the cam surface during the ensuing 18° of cam travel. This 18° of dwell serves to store the condition of the restrictive-latches which was sampled during the 16° of cam travel, as aforesaid. As is apparent in FIG. 12 and as will be explained more fully hereinafter, this 18° period of dwell of the punch pin cam followers corresponds to the advance portion of the tape drive cycle. The restrictive or permissive condition of the punch pin armatures which existed during an adjustable period up until a register control contact, hereinafter described, opens, is by this means, stored until the subsequent inception of the punching portion of the punch pin cycle. As will appear hereinafter, this allows the tape drive and the punch pin drive to be commanded at the beginning of each quadrant despite the fact that the inception of the actual tape drive precedes the inception of the actual punch pin drive by 39° of cam travel.

After this initial 39° of punch pin cam travel, during which the condition of the armatures is sampled and stored, and during which the advancing portion of the tape drive cycle is occurring, the punch pin cams 60, 61 enter the punching portion of their travel. This portion lasts for the remaining 51° of the 90° cycle, and includes an initial 18° of cam travel during which the cam followers drop with the cam outline to a low point 60a, 61a corresponding to the advance of the punch pins into and through the tape, and also includes a final 33° of cam travel during which the cam followers rise with the cam outline back to high point 60b, 61b corresponding to the withdrawal of the punch pins from the tape. The cam follower roller is urged by the associated spring to follow this outline, and will accordingly drive the bail to which it is attached in a reciprocating motion. Since both pairs of cam follower rollers are, during the same period of cam rotation, following an identical outline displaced 90° apart, both bails will simultaneously reciprocate through identical motions as indicated by the curve under discussion in FIG. 12.

Accordingly, during the downward portion of cam 60, 61 travel, toward low point 60a, any punch pin actuator such as the actuator 170 that is in the permissive condition relative to the restrictive-latch of its associated armature, is urged by the large bias force exerted by its associated spring 180 to rotate so as to drive the associated punch pin upward with sufficient force to perforate the corresponding position of tape 50, as previously described. The punching motion of any such unrestricted actuator is limited to follow the motion of the associated bail bar, against which it rides, during travel of that bail with ts follower rollers inwardly toward low point 60a, 61a of cams 60, 61. This action of each actuator is aptly termed permissive-restrictive, that is, the punching effected thereby is restricted unless specifically permitted by both energization of its associated electromagnet to unrestrict the particular actuator and movement of the bails on the aforesaid inward outline toward low point 60a, 61a. The bails 270m, 271m then complete the quadrant by driving the permitted actuators back to the reset position in response to the cam travel to the high point 60b, 61b, thereby withdrawing the punch pins associated therewith from tape 50.

When the bails 270m, 271m again attain the extreme reset position corresponding to high points 60b, 61b, the actuators will all have been driven 0.010 inch past the restrictive-latches by the bail bars, whether or not those actuators had partcipated in the preceding punch cycle. That is to say, the punching (unrestricted) actuators are driven back by the bail bars, and the restricted actuators that did not move in the punching direction during that cycle are picked up by the bail bars as they pass the restrictive-latches, so that all the actuators, regardless of their previous condition (restricted or permitted) are moved 0.010 inch past the vertical surfaces 120e–128e of the restrictive-latches at the high point 60b, 61b of cam 60, 61 travel. All the actuators are thereby reset to the position wherein their associated armatures may be depressed without engagement friction, as aforesaid. At this point, certain armatures will be selectively depressed to determine which punch pins will operate in the succeeding punching cycle, and the bails will move past the restrictive-latches to sample and record the condition of all the armatures, as already explained. Thus, selective energization of electromagnets at the inception of a punching cycle determines which actuators will go through a punching motion in the latter part of that cycle. Any given permutational code can thus be selected and punched in each punch cycle, which, because of intervening tape advance, corresponds to a single code-bit-group column of tape 50.

The permissive-restrictive operation which is provided by the present punch pin drive reduces inertia problems very considerably, and removes the necessity of moving any parts that are not required to move during a given cycle. The shaft 55 is run continuously at high speed, and the punching motion implicit therein is not utilized until needed. Since the shaft 55, with the cams 60, 61, is driven continuously at high speed, there is no stop-and-go inertia associated therewith. The spring loaded punch pin drive is selectively capable of following this cam controlled motion at any time, but need not follow it when no information is to be recorded. The combination of these attributes is to provide recording in the order of 75 codes per second as compared to approximately 18 codes per second which is characteristic of prior art tape punches.

The tape drive mechanism will now be described with general reference to FIGS. 1, 2, 5 and 13. As is best shown in FIGS. 2, 5 and 13, an electromagnet 74 is provided for the tape drive mechanism which is similar to the nine electromagnets 65 through 73 previously described with respect to the punch pin drive mechanism. Specifically, electromagnet 74 includes a central pole 74a and is mounted by a U-shaped pole bracket 87 (FIG. 13) to associated spacer bar 22. One arm of U-shaped pole bracket 87 supports a pivot bracket 114 which in turn supports for pivotal motion thereon an armature 129 which is similar to the armatures 120 etc. already described with reference to solenoid electromagnets 65 etc. Specifically, armature 129 includes an end 129a shaped as a restrictive-latch, an intermediate portion 129b, and a notch 129c at the remote end on the opposite side of pivot bracket 114. Armature 129 differs from armatures 120–128 in that end 129a is not of reduced width. The greater width serves to absorb the greater wear incident to the tape drive function. Secured to the outside surface of the spacer bar 22 by a screw 145 is an anchor bracket 155 having a curved upper portion 155a. A tension spring 165 extends from curved anchor bracket portion 155a to notch 129c, thereby to bias the armature away from code 74b and into engagement with a tape drive actuator presently to be described.

A tape drive actuator 179 is carried for rotation on shaft 40 (FIG. 13). Actuator 179 includes a collar 179a engaged with shaft 40, a vertically downward extending pair of arms 179b, a generally horizontally extending pair of arms 179c, a pair of braces 179d serving to rigidify arms 179b and 179c, and a pair of generally horizontal extension arm portions 179e. A generally rectangular restrictable member 179f is carried at the lowermost extreme of vertical arms 179b for a purpose similar to that of the corresponding restrictable portions 170f etc. already described with reference to the punch pin actuators.

As is best shown in FIG. 13, end 129a of armature 129 is shaped as a restrictive-latch including a first step defined by a first horizontal surface 129d and a first vertical surface 129e, which surface 129e is the actual permissive-restrictive surface, followed by a second step comprising a second horizontal surface 129f and a second vertical surface 129g. The surface 129f is machined to a finish suitable to accommodate sliding of restrictable member 179f thereacross during return to the reset position. This machining produces the vertical surface 129g, and there is no other significance to surface 129g. It will be recognized that this configuration is similar to that shown in FIG. 7 wherein is shown one type of restrictive-latch end employed with certain of the armatures associated with the punch drive actuators. However, the tape drive actuator 179 (on shaft 40) is urged in a clockwise direction, while the punch drive actuators (also on shaft 40) are urged in a counterclockwise direction. Consequently, the restrictable member 179f is biased to move inward of end 129a, i.e. toward intermediate portion 129b, and accordingly the latch configuration shown in FIG. 13 is employed therewith.

Shaft 55 carries a tape drive cam 300 for rotation therewith. Tape drive cam 300 has four high-point lobes, each of which is out of phase with the high-points on punch pin cams 60, 61, insofar as their outline on shaft 55 (FIG. 1) is concerned. However, as regards the movement of the various follower rollers on cams 300 and 60, 61, the high points coincide, as may be seen in FIG. 12. This will be more fully explained hereinafter. A cam follower roller 179m is mounted to extension portion 179e by a pin 179p for rotation thereon, and is adapted, when actuator 179 is so permitted by its restrictive-latch as hereinafter described, to follow the outline of cam 300. When restrictable member 179f is restricted by the restrictive-latch presented by vertical surface 129e of armature 129, cam follower roller 179m is restricted from clockwise motion at a radial position relative to cam 300 sufficient to touch only the high points of cam 300 as they pass underneath, as is illustrated in FIG. 13. In this restricted condition cam follower roller 179m is prevented from following the surface of cam 300 into the low portions between the high-point lobes.

A pawl 310 (FIG. 13) is rotatably pinned to the extreme end of horizontal actuator portion 179e by a pin 179t. Pawl 310 is formed in the usual configuration, with a curved arm 310a carrying a tooth 310b at the upper extreme end thereof. Pawl 310 also includes an eye portion 310c extending below the outline of actuator portion 179e and including an aperture 310d therein. Below aperture 310d, a pin 21p is secured to plate 21. A tension spring 186 has one end secured to aperture 310d, and has the opposite end connected to pin 21p. Tension spring 186 thereby acts to bias pawl 310 and actuator arm 179e downward, thus biasing latch portion 179f toward intermediate armature portion 129b, i.e. in the unlatched direction of travel. The spring 186 also acts to bias the tooth 310b to the left (FIG. 13), because of the offset of eye 310c, thereby engaging the teeth of a ratchet wheel presently to be described. It will be recognized that so long as restrictable member 179f is restricted by restrictive-latch vertical surface 129e (as illustrated in FIG. 13), the tension spring 186 cannot draw pawl 310 and arm 179e downward, thus preventing cam follower roller 179m from following cam 300 into the low points thereon.

A shaft 42, best seen in FIG. 2, extends between inner plate 21 and outer plate 20 and is rotatably journaled in each, the shaft 42 extending beyond outer plate 20 where it is terminated by a knob 42a which may be employed for manual turning of the shaft in order manually to advance or back up tape 50, as is sometimes desirable. A ratchet wheel 320 (FIG. 13), including teeth 321, is carried at a position on shaft 42 (FIG. 2) which is aligned with pawl 310, actuator 179, armature 129, and electromagnet 74. A pin wheel 330 (FIG. 13) is carried at a position on shaft 42 (FIG. 2) adjacent to die 201, and includes peripheral spaced pins 331. The number of pins 331 is equal to the number of ratchet teeth 321. As may be seen in FIGS. 6 and 10, pin wheel 330 is aligned with slot 204 in block 200, so that pins 331 pass through a portion of the slot during rotation of pin wheel 330. Pin wheel 330 has an appropriate diameter (FIG. 5) so that the pins 331 at the upper periphery of sprocket wheel 330 are at the same level as slit 203 in die block 200. As will be hereinafter described, this allows pins 331 to intercept the feed holes TDH in tape 50, and thereby advance the tape in response to the stepped drive of shaft 42 by ratchet wheel 320.

A pawl stop 350 is affixed to inner plate 21 at a position adjacent curved portion 310a of pawl 310. Pawl stop 350 includes a screw driver slotted head 351 and a shaft 352 which passes through inner plate 21 for engagement with lock nut 354 (FIG. 2). On shaft 352 is carried an eccentric cylindrical portion 353. When pawl stop 350 is loosened by means of the aforesaid lock nut, it may be turned by screw driver engagement with its slotted head 351 until eccentric portion 353 achieves a desired spacing from the adjacent portion of the pawl 310. The lock nut 354 may then be tightened, and thenceforth the pawl stop 350 acts as a fixed stop for pawl 310. A pivoted detent lever 360 presently to be described more fully, is horizontally disposed above ratchet wheel 320, as is best shown in FIGS. 2 and 13.

When electromagnet 74 is energized, armature 129 is momentarily depressed, thereby permitting restrictable member 179f to pass restrictive-latch vertical surface 129e. Energization of electromagnet 74, and thereby the removal of the restriction, is arranged as hereinafter explained to occur only when it is consistent with the position of cam 300, e.g. before the low point 300a is reached, so that only complete tape advance motions of pawl 310 are effected. Immediately upon removal of restriction, the actuator 179 is rotated in the clockwise direction by spring 186, as viewed in FIG. 13, forcing follower roller 179m to follow cam 300 into a low portion. As may be seen in FIG. 12, the low portion is reached at 39°, which is also the inception point for the punch pin punching motion. This movement of actuator 179 controls the downward motion of pawl 310 under the urging of spring 186, until pawl 310 is stopped by pawl stop 350 which jams the pawl tooth 310b against adjacent teeth of the ratchet wheel and thus locks the latter at a precise angular advance established by the adjusted position of the eccentric portion 353.

The downward motion of pawl 310 occurs during the aforesaid 39° of cam 300 motion under its follower roller from the high cam point 300a to the low cam point 300b, and is effective to turn ratchet wheel 320 through the angular distance of one tooth 321. It will be understood upon recourse to FIG. 12, that tape advance terminates at the end of this 39°, and that accordingly the punch pin punching motion can and does start at 39°. The pawl stop 350 may be employed to effect adjustments that ensure that tape advance ceases before punching begins. During the remaining 51° of the quadrant of cam 300 travel under its follower roller, i.e. from the low cam point 300b to the next high cam point 300a, the follower roller 179m dwells and then drives actuator 179 in the counterclockwise direction, to return pawl 310 upward to intercept the next tooth 321, and to return restrictable member 179f to restrictive-latch vertical surface 129e, for selective restriction or permission thereby. Since there are four high point lobes on cam 300, the tape drive cam can advance the ratchet teeth 321 by an angular distance equal to four ratchet teeth for every cam 300 revolution, depending on how many times permission occurs at restrictive-latch vertical surface 129e.

Detent lever 360 includes a pair of arms 361 and 362 (FIG. 2) joined at their mutual ends 361a and 362a by a pin 363. At their opposite mutual ends 361b and 362b, arms 361, 362 are joined by a cylindrical member 364 which is mounted for rotation on a shaft 365, including a slotted head 366, which shaft 365 is secured to inner plate 21. Intermediate these arms 361, 362 is included a transverse pivot pin 367 secured to arms 361, 362 by enlarged heads 367a, 367b. A detent roller 368 is journaled on pin 367 between arms 361, 362 for rotation thereon. A spring 380 has one end affixed to a pin 381 secured to plate 21, and the other end thereof attached to pin 363, thereby to urge detent lever 360 downwardly so that detent roller 368 rides the teeth 321 of ratchet wheel 320. Detent roller 368 is adapted to stabilize the position of ratchet wheel 320 by occupying the crotch between adjacent teeth 321. Detent roller 368 oscillates against the spring tension of spring 380 when ratchet wheel 320 is moved thereunder by pawl 310. The detent roller 368 thus does not prevent powered movement of ratchet wheel 320, but rather acts to stabilize a rest position of ratchet wheel 320 after each step advance thereof.

When shaft 42 is advanced with ratchet wheel 320 by an angular travel equal to one tooth 321, pin wheel 330 is advanced by the angular distance of one pin 331. Since pins 331 are engaged with tape drive holes TDH in tape 50, each permission of actuator 179 by restrictive-latch surface 129e is effective, through pawl 310 and ratchet wheel 320, to advance tape 50 by one pin 331 position on pin wheel 330, i.e. by an advance of one permutational code column on tape 50. The column-by-column advance of tape 50 thereby proceeds when, and only when, successive energizations of electromagnet 74 occur, permitting actuator 179 to advance pawl 310 by one ratchet tooth 321 each time. The action whereby ratchet wheel 320 is advanced only when restrictable member 179f is specifically permitted, is also aptly termed permissive-restrictive; that is, the tape advance is restricted unless specifically permitted. This action allows the shaft 55, and accordingly cam 300, to be driven at high speed, without there being any motion of the tape drive parts unless and until the electromagnet 74 is energized permitting tape advance. For the same reasons as previously mentioned with regard to the punch pin drive, this results in a distinct advance in the rate of recording with the present apparatus, compared to prior art constructions.

As previously mentioned, the tape drive cam 300 has the four high-point lobes thereof arranged out of phase with the four high-point lobes of punch drive cams 60, 61 (FIG. 1) relative to their fixedly mounted positions on shaft 55. However, the tape drive follower roller 179m is displaced 135° from each of punch drive follower rollers 270p, 270q and 271p, 271q. Accordingly, the cam 300 travel under follower roller 179, e.g. from a high-point, corresponds to the travel of cams 60, 61 from 135° ahead of that angular position, and from 135° behind that angular position, respectively. As may be seen in FIG. 12, the effect is to cause the high point 60b, 61b of punch drive cams 60, 61 to coincide with the high point 300a of tape drive cam 300, insofar as the motion of the various cam follower rollers is concerned. Thus, the downstroke of pawl 310 precedes the upward punching movement of punch actuators 170 etc. Subsequently, when the cam 300 is returning to a high-point, thus causing pawl 310 to be returned upward to engage another ratchet tooth 321, the punch pin cams 60, 61 are going through their punching motion, i.e. to a low-point 60a and back to another high-point 60b. As shaft 55 is rotated, this sequence is repeated four times per revolution as aforesaid, so that four punching opportunities are presented per revolution.

The tape drive is thereby restricted from tape advance movement until tape drive restrictable member 179f is so permitted by its restrictive latch, and the punch pin drive is restricted from punching movement for all code-bit row positions until selected ones of restrictable members 170f–178f are so permitted by their associated restrictive-latches. As already mentioned, this permissive-restrictive feature of both the tape drive and the punch pin drive enables the present apparatus to attain new recording speeds heretofore unattainable. Additionally however, the permissive-restrictive feature of the apparatus has an important advantage when a console keyboard is employed. A human operator at the console keyboard can, when using the present apparatus, delete an immediately discovered error without backing up the tape. This can be done because the tape advances before not after punching, i.e. tape advance is restricted unless specifically permitted. This feature will be more fully explained hereinbelow.

Referring now to FIGS. 14 and 15, there are shown further features of the tape drive apparatus. A bail 370 is pivoted on a shaft 371, which is in turn mounted to plate 20 by a nut 372 mated with threaded shaft end 371a.

Bail 370 is retained on shaft 371 by C-spring washer 371a. Bail 370 includes an arm 370a supporting a pressure shoe 373 by means of a pivot pin 374. The pressure shoe 373 is curved to fit over pin wheel 330 and apply pressure to tape 50 thereon, and includes a central peripheral slot 373a for accommodating pins 331, and serves to maintain the tape partially wrapped around the pin wheel with the pins thereof projecting through the tape feed holes. Bail 370 includes a flange 370b to enable manual movement thereof, between the full and broken line positions. At the top of pressure shoe 373 is an ear 373b to enable slight manual tilting of shoe 373 relative to pin wheel 330 when bail 370 is in the full outline position, e.g. to adjust the shoe to the pin wheel outline when lowering it into place. A protuberance 370c on bail 370 prevents the pressure shoe 373 from tilting too far counterclockwise when the bail arm 370a is itself tilted, as hereinafter described. This construction allows the pressure shoe 373 to be lifted from the pin wheel 330 and retained in lifted position during the insertion of a new length of tape into the tape punch.

Bail 370 includes an upstanding crank arm 370d immediately over shaft 371 and at the end thereof adjacent plate 21. Arm 370d carries a stud 370e which is engaged with one end of an over center spring 378. The other end of spring 378 is anchored to a casting stud 379 formed integrally with plate 21. The spring 378 maintains whichever position of bail 370 (shown in full outline) and position 370' (shown in broken outline) is set by manipulation of flange 370b, by normal over center spring action. Arm 370d is connected to a link 380 by a pin 381, and the other end of link 380 is connected to a stud 382 by an elongated slot 380a. A tape sensing bail 385 (FIG. 15) is mounted for rotation on a shaft 386, which is in turn fixed to plate 21 at a threaded end 386a by a nut 387. Bail 385 is retained on shaft 386 by C-spring washer 386b. Bail 385 includes an arm 385a which carries the aforesaid stud 382, thereby connecting bails 370 and 385 through link 380.

Tape sensing bail 385 includes a lever arm 385b, having one end 385c positioned to operate a Microswitch 390 at a roller 390a when the arm 385b is in the position shown in solid lines. End 385c is biased downwardly by connection to one end of a spring 385f, the other end of which is secured to stud 190x of comb 190. Microswitch 390 is mounted to a bracket 391 by screws 390b, 390c, and nuts 390d, 390e. Plates 45, 46 are mounted to plates 20, 21 by spacer members 20f, 21f respectively. Bracket 391 is mounted through plate 45 and spacer member 21f to comb 190. Lever arm 385b has another end 385d, opposite to end 385c, which carries a roller 395, adapted to engage and sense the presence or absence of tape 50 thereover. Input tape table 198 ends just before the arcuate upward path of roller 395 to allow the roller to approach and engage the tape through a slot in die block assembly 200.

When manual flange 370b is lifted to tilt bail 370 upward, thus lifting the pressure shoe 373 away from pin wheel 330, the over center spring 378 holds the raised position 370', and the link 380 operates the bail 385. The slot 380a ensures that no effect occurs on bail 385 until and unless bail 370 has been deliberately moved completely to the up position shown in broken outline 370'. Movement of arm 385 is limited by pin 385e secured to plate 21. The arms 385c, 385d are then also positioned as shown in broken lines at 385c' and 385d', and the roller 395 is lowered below the surface of the table 198. Thus when new tape is to be threaded into the punch, manual raising of flange 14 lowers the roller 395 so the tape can be inserted. During operation with pressure shoe 373 down, the roller 395 engages the underside of the tape and hence is retained depressed slightly below the illustrated position (wherein it is shown as resting against the bottom of die 201) against the bias of spring 385. This slight depression is sufficient to prevent operative engagement of the end 385c of the sensing arm 385b with the roller 390a of Microswitch 390. When tape 50 breaks or is otherwise not present at roller 395, the roller 395 moves up a slight distance effective to operate the microswitch 390 by the slight downward motion of end 385c. This operation of the Microswitch may be used to remove power drive from the drive shaft 42 and thus halt operation of the tape punch.

As best shown in FIGS. 1 and 2, a bell crank 400 is pivotally supported on a stud shaft 401 secured to plate 21. Bell crank 400 is axially retained on shaft 401 by a C-spring washer 402. At one end of bell crank 400 is an overturned flange 400a, and at the remote end, on the other side of pivot 401, is carried a pin 400b which pivotally connects bell crank 400 to an arm 405a of a feed-release member 405. A tension spring 406 has one end connected to the inner end (FIG. 2) of pin 400b, and has the other end thereof connected to a stud 407 secured to plate 21. Feed-release member 405 includes a generally C-shaped opening 405b which opens to the right (as viewed in FIG. 1) and encircles a semi-circular lateral portion of shaft 41. A wedge-shaped end 405c of feed-release member 405 bears against ear 310f of pawl 310. When flange 400a of bell crank 400 is manually depressed against the bias of spring 406, feed-release member 405 is pushed laterally to the left (as viewed in FIG. 1) in sliding motion across shaft 41 at C-shaped opening 405c. This pushing motion of feed-release member 405 is transmitted to ear 310f of pawl 310 by the wedge-shaped end 405c. This tilts the upper portion of pawl 310 in the clockwise direction (as viewed in FIG. 1) on pivot pin 179t, thereby freeing pawl tooth 310b from ratchet teeth 321. The pawl 310 tilts sufficient to touch and raise detent arm 360, so that detent roller 368 is also lifted free of ratchet teeth 321. By this action, ratchet wheel 320 is freed for rotation in either direction, so that the tape 50 may be manually moved forward or backward by manual manipulation of the aforesaid knob 42a (FIG. 2) for any desired purpose.

Referring now to FIGS. 16 and 17, there is shown nine parity-check contact assemblies 420 through 428 associated with the nine punch actuators 170 through 178 respectively. The four contact assemblies 420 through 423 are staggered on opposed sides of plate 45, in alignment with their associated punch pin actuators. The five contact assemblies 424 through 428 are staggered on opposed sides of plate 46, in alignment with their associated punch pin actuators. The various contact assemblies are secured to plates 45, 46 by screws 430. The detail parts of one contact assembly 426 and the relationship thereof to actuator 176 and electromagnet armature 127 will be described with reference to FIG. 17, and will illustrate the construction of the other eight.

At flared portion 176e is carried a pin 176y to which is attached a fork-shaped driving member 450 of insulating material, the pair of fork arms straddling portion 176e and secured to either end of pin 176y. The remote end 450a of member 450 is secured in the conventional manner to depending movable contact arm 426a of contact assembly 426 by means of pin 426b. The member 450 is so proportioned, that movable contact arm 426a is held away from fixed contact arm 426c when the latch 176f is in the latched position relative to armature 127, as illustrated. When the actuator 176 rotates in the clockwise direction (as viewed in FIG. 17) to its punch position, contact arms 426a, 426b are brought together by member 450. The restricted and punching positions of actuator 176 thereby correspond relatively to the open-contacts and closed-contacts position of contact assembly 426. As is shown in FIG. 12, the parity check contacts 420–428 close during the cam 60, 61 travel under their follower rollers from 49° to 66° in each quadrant, to correspond to the low point 60a, 61a of the punch pin cam cycle. The nine contact assemblies 420 through 428 thereby sense the movement of the nine punch actuators 170 through 178 to their punch positions, and the contact assemblies may be employed in a parity checking system as disclosed in the aforementioned Blodgett et al. patent to perform a parity check on the permutational code punched in each column of tape 50, as it is punched.

The tape-drive actuator 179 is also shown in FIGS. 16 and 17, together with a contact assembly 429 therefor, aligned therewith on plate 45, and secured by screws 430. At the lower portion of the vertical pair of arms 179b is located a pin 179y extending between the arms and connected to the pair of fork arms of fork-shaped member 451 of insulating material. The remote end of member 451 is connected to movable contact arm 429a by pin 429b. It will be remembered that tape drive actuator 179, unlike the other actuators on shaft 40, rotates in the clockwise direction (as viewed in FIG. 17). Accordingly the restricted position is illustrated in FIG. 17, and the member 451 is proportioned to close movable contact arm 429a against fixed contact arm 429b in that position. Thus, in regard to the tape-drive actuator 179, the permitted and restricted positions correspond to the open-contacts and closed-contacts positions of contact assembly 429. As is shown in FIG. 12, contact 429 opens only during the period of cam 300 travel under its follower roller from 33° to 60° in each quadrant. The signal derived at contact assembly 429 may be employed to control other functions which depend upon the position of tape-drive actuator 179.

Figure 19:
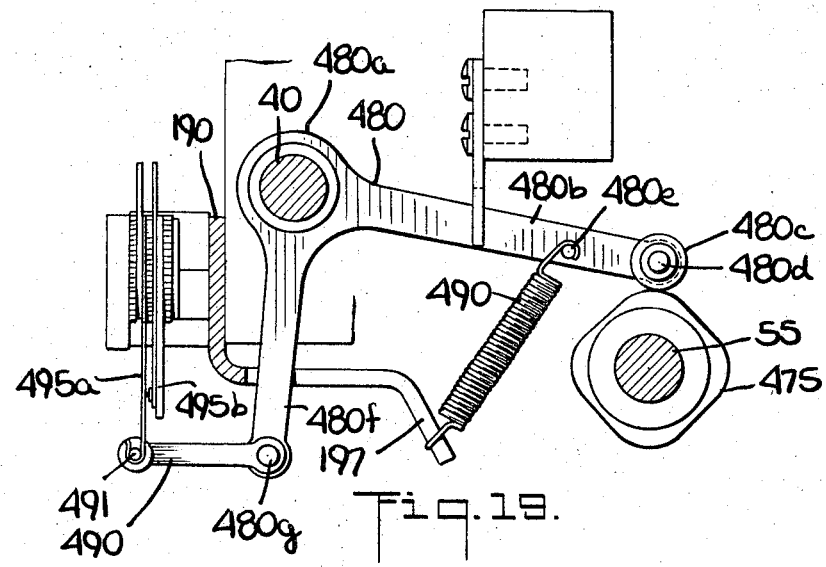
FIG. 19 is a partial detail section view of the apparatus shown in FIG. 18 and viewed along the plane 19—19 therein.

As is shown in FIGS. 18 and 19, an additional cam 475 is mounted for rotation with shaft 55. In the apparatus as described herein, the pulses energizing the various punch drive must be controlled by means responsive to the angular position of shaft 55, and thereby the angular position of punch cams 60, 61 and tape-drive cam 300. Accordingly, cam 475 employs a four lobe configuration appropriate to serve that function. The means associated with cam 475 that effect that function will now be described.

A bell crank 480 is carried by shaft 40, for rotation thereon, at a collar 480a. An arm 480b thereof carries a follower roller 480c, rotatably mounted thereto by pin 480d. One end of a tension spring 490 is engaged with arm 480b at aperture 480e therein. The other end thereof is secured to a comb tooth 197 of comb 190. Follower roller 480c is thereby biased to follow the cam surface of cam 475. A remote arm 480f of bell crank 480, disposed on the other side of shaft 40, is connected by a pin 480g to a member 490. A contact assembly 495 is secured to plate 45 and includes a movable contact arm 495a and a fixed contact arm 495b. The remote end of member 490 is connected, via pin 491, to movable contact arm 495a. Upward motion of follower roller 480c, relative to a reference radius thereof, thus serves to close the contact arms 495a, 495b, while downward motion of follower roller 480c, relative to the same reference radius, serves to open contact arms 495a, 495b.

With reference to FIGS. 12 and 20, the codal information source 500 is adapted to produce codal information at a rate equal to or less than four times the rate of revolution of shaft 55. In other words, since there are four lobes to cams 60, 61, 300, and 475, there are four recording opportunities for every revolution of shaft 55, and the codal rate of source 500 is chosen to be equal to or less than that rate. In practice, the codal rate of source 500 may, within limits, be rendered equal to or less than the recording opportunity rate by raising the shaft speed of shaft 55. Codal information source 500 may comprise any usual source, such as a tape reader, a data transmission line, or a console keyboard.

The codal information from source 500 is entered into a storage register system 600 which is adapted to store, implicitly, codal information regarding the punching of the tape drive hole and the advance of the tape, and explicitly, codal information regarding which permutational code-bits are to be punched. The cam 475 circuit breaker contacts 495a, 495b are closed, and thereby produce a positive-going pulse (FIG. 12), from 60° to 20° of cam 475 travel, and this pulse is fed to register 600, which is adapted to respond by discharging the codal information stored therein to the tape drive electromagnet 74 and the punch pin drive electromagnets 65–73. Such registers are well known, and will not be described in further detail. An additional pair of contacts (not shown) may be controlled by cam 475 to produce a different pulse (FIG. 12) which may be used for any desired purpose.

The cam 475 circuit breaker contacts 495a, 495b are closed four times every revolution of shaft 55, and their closed portion (FIG. 12) is adjustable so that it can be made to coincide with the portion of the follower roller motions on cams 60, 61 and 300 that is consistent with recording of new permutational code-bits. That is to say, the contacts 495a, 495b can, for example, be adjusted to be open during the 20° to 60° of cam travel under the various followers, which example duration is within the period during which neither the tape drive actuator 179 nor the punch pin drive actuators 170–178 can accept new permissions or restrictions, since they are in the critical portions of the previous cycle. In the portion of the actuator travel wherein contacts 495a, 495b are closed, they can accept new permissions and restrictions. This is so because up to 20° the punch pin actuators will merely catch up to their bails after they are so permitted by their armatures, and the tape drive actuator will merely catch up to the cam 300 outline. Also, after 60° the contacts 495a, 495b are closed long enough (50° of travel) to ensure that the bails will drive the punch pin actuators back to reset during the closed condition thereof, so that the pulse will be sampled and recorded by the restrictive-permissive arrangement of the restrictable members and restrictive-latches for utilization in the very next punching cycle. Thus, by employing codal data information register 600, controlled by circuit breaker contacts 495a, 495b responsive to the angular position of shaft 55, the various armatures are moved out of the path of the various actuators only when doing so will be effective in a consistent manner.

When no codal information is entered into register 600, the pulses from contacts 495a, 495b are ineffective to energize the various electromagnets, and the various restrictable members remain restricted by their associated restrictive-latches from punching or tape advancing motion. As soon as codal information is entered into register 600, it is discharged to the appropriate electromagnets by the next closed contact pulse from contacts 495a, 495b, so that it is properly effective in the various cycles. The system can run continuously if codal information is continuously supplied to the register 600, but the various actuators will cease motion for any periods (brief or long) in which no information is entered into register 600. Meanwhile the shaft 55 continues running at full speed so that no inertia problems are introduced there. This permissive-restrictive system of parts causes the great advance in recording speed attained with the apparatus according to the present invention.

When a console keyboard is employed as source 500, the permissive-restrictive operation of the invention has an additional important advantage. The tape advance is directly actuated by any console key, except the delete key. If the correct key has been punched, the operator continues. If the incorrect key was punched and recognized as such before another key was punched, the delete key may be punched. This key enters a code-bit of information into register 600 corresponding to every electromagnet except the tape drive electromagnet 74. Thus, the next pulse from contacts 495a, 495b causes all the punch pins to operate, but without the usual preceding advance of the tape 50 to a new column. Since in the permissive-restrictive system the tape advance precedes the punching, i.e. is restricted unless specifically permitted, this causes a deletion of the erroneous column which has not moved out from under the punch pins. The delete key is thus effective to render the incorrect column null and void, and since tape advance does not follow tape punch, it was not necessary to turn back the tape to accomplish this deletion.

The invention has been shown and described with reference to an illustrative, not a limiting, embodiment. All variations on the inventive principles are contemplated as being within the scope of the invention as claimed.

What is claimed is:

1. An apparatus for cyclically advancing and then perforating tape with intelligence comprising:
   (a) a plurality of striking means for effecting punched apertures therein, each including
      (i) an actuator, movable in first and second reciprocal directions, and
      (ii) perforating means coupled to said actuator, for movement toward and away from said tape when said actuator moves in said first and second directions respectively, for effecting punched apertures in said tape;
   (b) means for selectively retaining any of said striking means at a position away from said tape;
   (c) bias means biasing each said striking means for movement toward said tape;
   (d) control and reset means, including
      (i) a rotatable cam having high and low cam surface points thereon, and
      (ii) cam follower means biased to follow said cam surface, and having a portion contactable with said actuator, for control of the movement of said actuator toward said first position and for driving of said actuator back to said second position from said first position, and
   (e) means for advancing said tape in discrete increments prior to each cycle of perforation.

2. The combination as set forth in claim 1 wherein said rotatable cam is journalled to a continuously rotating shaft.

3. The combination as set forth in claim 1 wherein said cam surface is contoured such that said portion of said cam follower means which is contactable with said actuator is moving at a relatively low speed when said portion and said actuators are engaged into contact or disengaged from contact.

4. The combination as set forth in claim 1 wherein said control and reset means constrain the motion of said actuator in said first direction.

5. The combination as set forth in claim 4 wherein said tape advancing means are effective to advance said tape after said control and reset means have engaged said actuator and before said control and reset means have allowed sufficient motion of said actuator in said first direction for said perforating means to effect punched apertures in said tape.

6. The combintion as set forth in claim 4 wherein said tape advancing means are effective to advance said tape after said control and reset means have engaged said actuators and before said control and reset means have allowed sufficient motion of said actuators in said first direction for said perforating means to effect punched apertures in said tape.

7. An apparatus for perforating tape with intelligence comprising:
   (a) a plurality of striking means for effecting punched apertures therein, including
      (i) a plurality of individual actuators, each independently movable in first and second reciprocal directions, and
      (ii) a corresponding plurality of perforating means arranged in a row transverse to the length of said tape and connected to individual ones of said actuators, for individual movement toward and away from said tape when the corresponding actuators move in said first and second directions respectively, for effecting punched apertures in said tape;
(b) means for selectively retaining any of said striking means at a position away from said tape;
(c) bias means biasing each of said striking means for movement toward said tape;
(d) control and reset means, including
    (i) a rotatable cam having high and low cam surface points thereon, and
    (ii) cam follower means biased to follow said cam surface, and having a portion contactable with all of said actuators, for control of the movement of any actuators during movement toward said first position, and for driving of any actuators at said first position back to said second position; and
(e) means for advancing said tape in discrete increments prior to each cycle of perforation.

8. The combination as set forth in claim 7 wherein said rotatable cam is journalled to a continuously rotating shaft.

9. The combination as set forth in claim 7 wherein said control and reset means constrains the motion of said actuators in said first direction.

10. An apparatus for perforating tape with intelligence comprising:
(a) a plurality of striking means, including
    (i) a plurality of individually rotatable actuators, each independently movable in rotation between first and second reciprocal directions, and
    (ii) a corresponding plurality of perforating means arranged in a row transverse to the length of said tape and coupled to individual ones of said actuators, for individual movement toward and away from said tape when the corresponding actuators move in said first and second directions respectively, for effecting punched apertures in said tape;
(b) means for selectively retaining any of said striking means, including
    (i) a plurality of restrictable members, one carried by each said actuator, and
    (ii) a corresponding plurality of armatures, each including a restrictive latch located at a position away from said tape, and each adapted selectively to be moved into and out of the path of the corresponding one of said restrictable members;
(c) bias means biasing each said striking means for movement toward said tape;
(d) control and reset means, including
    (i) a rotatable cam having high and low cam surface points thereon, and
    (ii) cam follower means biased to follow said cam surface, and having a portion contactable with all of said actuators, for control of the movement of any actuators during movement toward said first position, and for driving of any actuators at said first position back to said second position;
(e) selecting means, including a plurality of electromagnets, each adapted to move one of said restrictive latch armatures selectively into and out of restrictive relationship to the corresponding one of said striking means at the restrictable member thereof; and
(f) means for advancing said tape in discrete increments prior to each cycle of perforation.

11. An apparatus for perforating tape with intelligence comprising:
(a) a plurality of striking means for effecting punched apertures therein, including
    (i) a plurality of individually rotatable actuators, each independently movable in rotationally reciprocable directions, and
    (ii) a corresponding plurality of perforating means arranged in a row transverse to the length of said tape and connected to individual ones of said actuators, for individual movement toward and away from said tape with their corresponding actuators, for effecting punched apertures in said tape, alternate ones of said actuators disposed upstream with respect to the motion of said tape and the remaining ones of said actuators disposed downstream with respect to the motion of said tape, whereby the group of said alternate actuators and the group of remaining actuators rotate in opposite rotational directions to move their respective perforating means toward said tape;
(b) means for selectively retaining or releasing any of said striking means at a position away from said tape;
(c) bias means biasing each of said striking means for movement toward said tape;
(d) control means for rotationally moving each said actuator back against said biasing means at the termination of each movement of said perforating means toward said tape, to present said actuator to said retaining means; and
(e) means for advancing said tape in discrete increments prior to each cycle of perforation.

12. An apparatus for perforating tape with intelligence comprising:
(a) a plurality of striking means for effecting punched apertures therein, including
    (i) a plurality of individually rotatable actuators, each independently movable in rotationally reciprocal directions, and
    (ii) a corresponding plurality of perforating means arranged in a row transverse to the length of said tape and connected to individual ones of said actuators, for individual movement toward and away from said tape with their corresponding actuators, for effecting punched apertures in said tape, alternate ones of said actuators disposed upstream with respect to the motion of said tape and the remaining ones of said actuators disposed downstream with respect to the motion of said tape, whereby the group of said alternate actuators and the group of remaining actuators rotate in opposite rotational directions to move their respective perforating means toward said tape;
(b) means for selectively retaining any of said striking means at a position away from said tape;
(c) bias means biasing each of said striking means for movement toward said tape; and
(d) control and reset means, including
    (i) a rotatable cam having high and low cam surface points thereon,
    (ii) a pair of cam follower means biased to follow said cam surface, one having a portion contactable with all of said alternate ones of said actuators, and the other having a portion contactable with all of said remaining ones of said actuators, for control of the movement of any actuators during movement of said perforating means toward said tape, and for driving of the actuators of any perforating means in perforating contact with said tape back to said selective retaining means; and
(e) means for advancing said tape in discrete increments prior to each cycle of perforation.

13. An apparatus according to claim 12 wherein said cam is contoured to include a portion causing said cam follower means to drive said actuators past and selective retaining means against said spring bias, and selecting means for actuating selected ones of said retaining means during the period when said actuators are so disposed.

14. An apparatus for advancing and perforating tape with information, comprising:
  (a) striking means, reciprocally movable toward and away from said tape, for effecting punched apertures therein;
  (b) means for selectively retaining said striking means at a position away from said tape;
  (c) bias means biasing said striking means for movement toward said tape;
  (d) a tape advance actuator reciprocally movable to first and second positions;
  (e) bias means biasing said tape advance actuator toward said first position;
  (f) means for selectively retaining said tape advance actuator away from said first position;
  (g) a rotatable pin-wheel engageable with tape drive holes in said tape for driving thereof when rotated;
  (h) means responsive to each movement of said tape advance actuator to said first position, by rotating said pin-wheel through an angle sufficient to advance said tape to the next adjacent tape drive hole; and
  (j) a rotatable shaft,
  (k) control-reset means, for phasing the advance of said tape ahead of the perforation of said tape, including
    (i) a tape drive cam on said drive shaft for rotation therewith, for control of said tape advance actuator movement, and
    (ii) a punch drive cam on said shaft for rotation therewith, for control of said striking means movement.

References Cited
UNITED STATES PATENTS

| | | | |
|---|---|---|---|
| 3,096,015 | 7/1963 | Bradbury | 234—107 |
| 3,301,477 | 1/1967 | Edwards | 234—107 |

GERALD A. DOST, *Primary Examiner.*